US012155311B2

(12) United States Patent
Yabuzaki

(10) Patent No.: US 12,155,311 B2
(45) Date of Patent: Nov. 26, 2024

(54) INTEGRATED CIRCUIT FOR LOAD-STATE-BASED CONTROL AND POWER SUPPLY CIRCUIT CONTAINING THE SAME

(71) Applicant: FUJI ELECTRIC CO., LTD., Kawasaki (JP)

(72) Inventor: Jun Yabuzaki, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 265 days.

(21) Appl. No.: 17/824,575

(22) Filed: May 25, 2022

(65) Prior Publication Data

US 2023/0010211 A1 Jan. 12, 2023

(30) Foreign Application Priority Data

Jul. 7, 2021 (JP) ................................. 2021-112626

(51) Int. Cl.
*H02M 3/335* (2006.01)
*H02M 1/00* (2007.01)
*H02H 7/12* (2006.01)

(52) U.S. Cl.
CPC ..... *H02M 3/33523* (2013.01); *H02M 1/0003* (2021.05); *H02M 1/0009* (2021.05); *H02H 7/1213* (2013.01)

(58) Field of Classification Search
CPC ............. H02M 1/0009; H02M 1/0003; H02M 3/33523
See application file for complete search history.

(56) References Cited

U.S. PATENT DOCUMENTS

| 9,621,053 B1 * | 4/2017 | Telefus ............. H02M 3/33507 |
| 10,056,842 B2 | 8/2018 | Cannenterre et al. |
| 10,355,606 B2 | 7/2019 | Cannenterre et al. |
| 2012/0200229 A1 * | 8/2012 | Kunst .................. H05B 45/385 |
| | | 315/186 |
| 2014/0078792 A1 * | 3/2014 | Yabuzaki .......... H02M 3/33507 |
| | | 363/53 |

(Continued)

FOREIGN PATENT DOCUMENTS

| JP | 3412624 B2 | 6/2003 |
| JP | 5601158 B2 | 10/2014 |
| WO | WO-03036782 A2 * | 5/2003 | .......... H02M 3/3381 |

*Primary Examiner* — Sisay G Tiku
(74) *Attorney, Agent, or Firm* — Rabin & Berdo, P.C.

(57) ABSTRACT

An integrated circuit for a power supply circuit that includes a transformer including a primary coil, a secondary coil, and an auxiliary coil, and a transistor controlling a current flowing through the primary coil. The integrated circuit includes a first determination circuit determining a state of the load; a second determination circuit determining whether a current of the secondary coil is in a continuous mode and a discontinuous mode, in which the current of the secondary coil respectively does not reach, and reaches, zero when the transistor is off; an oscillator circuit outputting an oscillator signal; and a switching control circuit controlling switching of the transistor in response to a determination result of the second determination circuit and the oscillator signal, and in response to the oscillator signal irrespective of the determination result of the second determination circuit, respectively when the state of the load is light and heavy.

20 Claims, 22 Drawing Sheets

(56) References Cited

U.S. PATENT DOCUMENTS

| | | | | |
|---|---|---|---|---|
| 2014/0301118 A1* | 10/2014 | Yabuzaki | .......... | H02M 3/33507 |
| | | | | 363/39 |
| 2016/0261200 A1* | 9/2016 | Yabuzaki | ................ | H02M 1/32 |
| 2017/0201181 A1* | 7/2017 | Yabuzaki | ................ | H02M 1/12 |
| 2019/0044505 A1* | 2/2019 | Yabuzaki | ............. | G01R 19/252 |
| 2019/0052176 A1* | 2/2019 | Yabuzaki | ................ | H02M 1/32 |
| 2023/0143191 A1* | 5/2023 | Endo | ................... | H02M 1/0022 |
| | | | | 363/21.12 |
| 2023/0361689 A1* | 11/2023 | Khamesra | ........... | H02M 3/1582 |

\* cited by examiner

| CONDITION | ss_end | btm_cmp | Vfb | crst1 | OPERATION OF BOTTOM SWITCH CIRCUIT 50 |
|---|---|---|---|---|---|
| CONDITION A1 | L (AT STARTUP) | ALWAYS L | NA | NA | OUTPUT pwm_s UPON RECEIPT OF osc_out |
| CONDITION A2 | H (DURING STEADY STATE) | ALWAYS L | NA | NA | OUTPUT pwm_s UPON RECEIPT OF osc_out |
| CONDITION A3 | | L WHEN ON, ALWAYS H WHEN OFF | Vfb>Vfbb (HEAVY LOAD) | H | OUTPUT pwm_s UPON RECEIPT OF osc_out DURING CONTINUOUS OPERATION |
| CONDITION A4 | | L WHEN ON, REPEAT H/L WHEN OFF | Vfb<Vfbb (LIGHT LOAD) | L | btm_cmp GOES L AFTER RECEIPT OF osc_out DURING DISCONTINUOUS OPERATION, AND THEN OUTPUT pwm_s AT PREDETERMINED TIMING |

FIG. 3

| CONDITION | mode | up_down | RELATIONSHIP BETWEEN uc_out AND udc_out UPON RECEIPT OF osc_out | out0 OUTPUT TIMING |
|---|---|---|---|---|
| CONDITION B1 | L (UNCOUPLED STATE OR CONTINUOUS OPERATION) | — | — | UPON RECEIPT OF osc_out |
| CONDITION B2 | H (DISCONTINUOUS OPERATION) | H (UP-DOWN COUNTER 91 COUNTS UP) | uc_out=udc_out (cnt_cmp=H) | WHEN NEXT btm_cmp GOES L AFTER RECEIPT OF osc_out |
| CONDITION B3 | H (DISCONTINUOUS OPERATION) | L (UP-DOWN COUNTER 91 COUNTS DOWN) | uc_out<udc_out (cnt_cmp=L) | WHEN uc_out=udc_out (cnt_cmp=H) |

FIG. 15

INTEGRATED CIRCUIT FOR LOAD-STATE-BASED CONTROL AND POWER SUPPLY CIRCUIT CONTAINING THE SAME

CROSS-REFERENCE TO RELATED APPLICATION

The present application claims priority pursuant to 35 U.S.C. § 119 from Japanese patent application number 2021-112626 filed on Jul. 7, 2021, the entire disclosure of which is hereby incorporated by reference herein.

BACKGROUND

Technical Field

The present disclosure relates to an integrated circuit and a power supply circuit.

Description of the Related Art

There are integrated circuits each configured to control a flyback AC-DC converter based on an inductor current and a feedback voltage corresponding to an output voltage (for example, Japanese Patent No. 5601158, U.S. Pat. No. 10,056,842 and 10,355,606, and Japanese Patent No. 3412624).

Incidentally, a common AC-DC converter includes a control circuit configured to control an operation of the AC-DC converter. The control circuit is to appropriately control a transistor in the AC-DC converter according to the state of a load.

SUMMARY

A first aspect of an embodiment of the present disclosure is an integrated circuit for a power supply circuit that generates for a load an output voltage of a predetermined level from an input voltage thereof, the power supply circuit including a transformer including a primary coil, a secondary coil, and an auxiliary coil, and a transistor configured to control a current flowing through the primary coil, the integrated circuit being configured to drive the transistor, the integrated circuit comprising: a first determination circuit configured to determine whether the load is in a first state or a second state; a second determination circuit configured to determine whether a current of the secondary coil is in a continuous mode in which the current of the secondary coil does not reach zero when the transistor is off, or in a discontinuous mode in which the current of the secondary coil reaches zero when the transistor is off; an oscillator circuit configured to output an oscillator signal; and a switching control circuit configured to control switching of the transistor in response to a determination result of the second determination circuit and the oscillator signal, when the load is in the second state, and in response to the oscillator signal irrespective of the determination result of the second determination circuit, when the load is in the first state.

A second aspect of an embodiment of the present disclosure is an integrated circuit for a power supply circuit that generates for a load an output voltage of a predetermined level from an input voltage thereof, the power supply circuit including a transformer including a primary coil, a secondary coil, and an auxiliary coil, and a transistor configured to control a current flowing through the primary coil, the integrated circuit being configured to drive the transistor, the integrated circuit comprising: a first comparator circuit configured to compare a first voltage corresponding to a voltage on a high potential side of the transistor, with a second voltage; an oscillator circuit configured to output an oscillator signal; and a switching control circuit configured to control switching of the transistor, the switching control circuit including an on signal output circuit configured to output an on signal to turn on the transistor, after the oscillator signal is received and a first count of the first voltage reaching the second voltage reaches a reference count, in a case where a current of the secondary coil is in a discontinuous mode in which the current of the secondary coil reaches zero when the transistor is off, an off signal output circuit configured to output an off signal to turn off the transistor, based on a current flowing through the transistor, a first holding circuit configured to hold the reference count, and an adjustment circuit configured to increase the reference count under a first condition, when a load current flowing through the load decreases, and reduce the reference count under a second condition, when the load current increases.

A third aspect of an embodiment of the present disclosure is a power supply circuit configured to generate for a load an output voltage of a predetermined level from an input voltage thereof, the power supply circuit comprising: a transformer including a primary coil, a secondary coil, and an auxiliary coil; a transistor configured to control a current flowing through the primary coil; and an integrated circuit configured to drive the transistor, the integrated circuit including a first determination circuit configured to determine whether the load is in a first state or in a second state, a second determination circuit configured to determine whether a current of the secondary coil is in a continuous mode in which the current of the secondary coil does not reach zero when the transistor is off, or in a discontinuous mode in which the current of the secondary coil reaches zero when the transistor is off, an oscillator circuit configured to output an oscillator signal, and a switching control circuit configured to control switching of the transistor in response to a determination result of the second determination circuit and the oscillator signal, when the load is in the second state, and in response to the oscillator signal irrespective of the determination result of the second determination circuit, when the load is in the first state.

A fourth aspect of an embodiment of the present disclosure is a power supply circuit configured to generate for a load an output voltage of a predetermined level from an input voltage thereof, the power supply circuit comprising: a transformer including a primary coil, a secondary coil, and an auxiliary coil; a transistor configured to control a current flowing through the primary coil; and an integrated circuit configured to drive the transistor, the integrated circuit including a first comparator circuit configured to compare a first voltage corresponding to a voltage on a high potential side of the transistor, with a second voltage, an oscillator circuit configured to output an oscillator signal, and a switching control circuit configured to control switching of the transistor, the switching control circuit including an on signal output circuit configured to output an on signal to turn on the transistor after the oscillator signal is received and a count of the first voltage reaching the second voltage reaches a reference count, in a case where a current of the secondary coil is in a discontinuous mode in which the current of the secondary coil reaches zero when the transistor is off, an off signal output circuit configured to output an off signal to turn off the transistor, based on a current flowing through the transistor, a first holding circuit configured to hold the reference count, and an adjustment circuit configured to increase the reference count under a first condition, when a load current flowing through the load decreases, and to reduce the reference count under a second condition, when the load current increases.

BRIEF DESCRIPTION OF THE DRAWINGS

FIG. 3 is a diagram for describing control of a bottom switch circuit 50 by a control circuit 40.

FIG. 15 is a diagram illustrating a timing at which an output circuit 111 outputs a signal out0.

DETAILED DESCRIPTION

At least following matters will become apparent from the descriptions of the present specification and the accompanying drawings.

Embodiments

Figure 1:
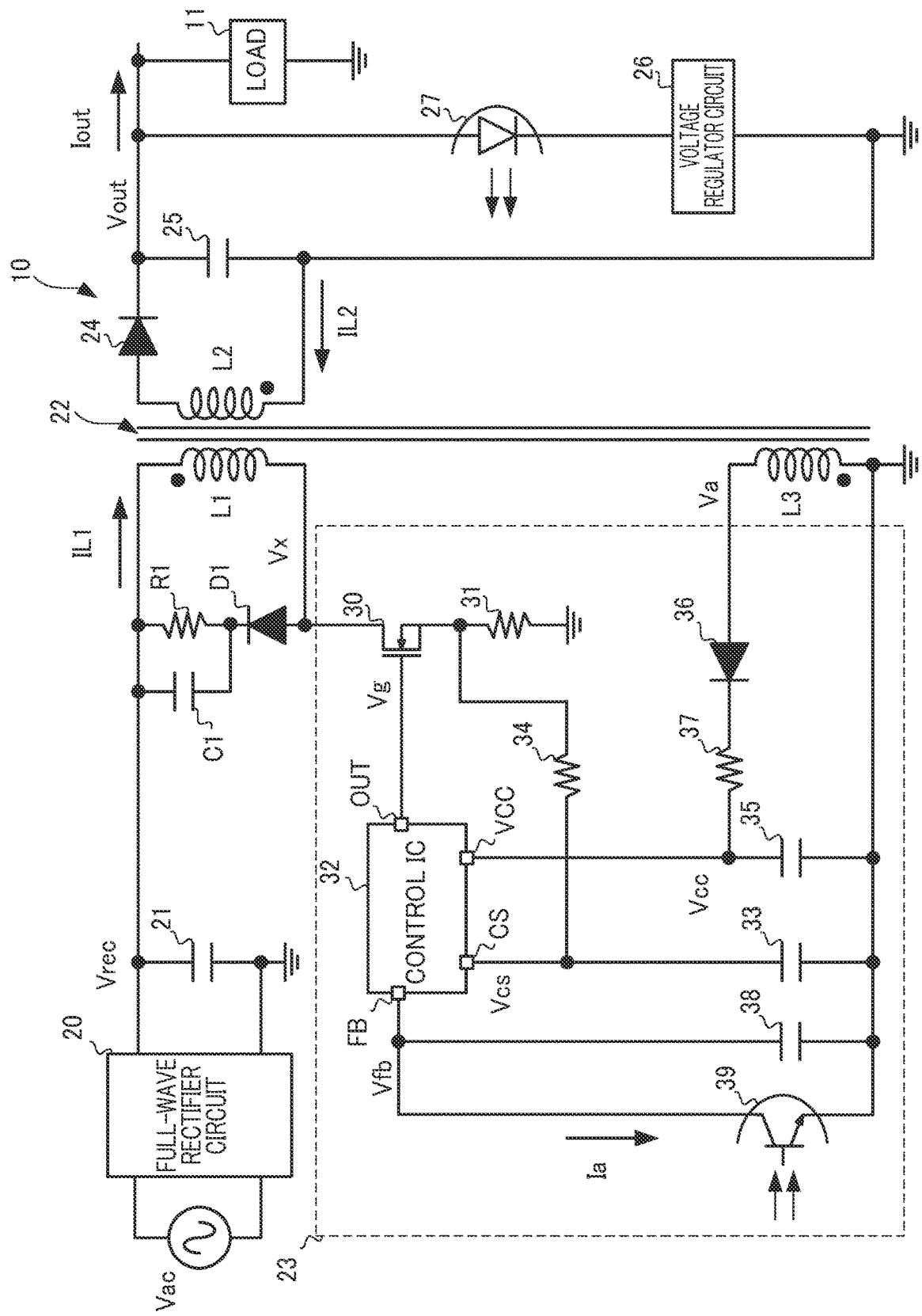
FIG. 1 is a diagram illustrating a configuration example of an AC-DC converter 10.

FIG. 1 is a diagram illustrating a configuration example of an AC-DC converter 10 according to an embodiment of the present disclosure. The AC-DC converter 10 is a flyback power supply circuit that generates an output voltage Vout of a predetermined level from an alternating current (AC) voltage Vac of a commercial power supply.

<<<Overview of AC-DC Converter 10>>>

The AC-DC converter 10 includes a full-wave rectifier circuit 20, capacitors 21 and 25, a transformer 22, a control block 23, diodes 24 and D1, a voltage regulator circuit 26, a light-emitting diode 27, a resistor R1, and a capacitor C1. The AC-DC converter 10 supplies power to a load 11.

The full-wave rectifier circuit 20 full-wave rectifies a predetermined AC voltage Vac, which is an input voltage, to output a resultant voltage to a primary coil L1 of the transformer 22 and the capacitor 21 as a voltage Vrec. The capacitor 21 smooths the voltage Vrec. The AC voltage Vac is, for example, a voltage having an effective value of 100 to 240 V and a frequency of 50 to 60 Hz.

The transformer 22 has the primary coil L1 provided on the input side, a secondary coil L2 magnetically coupled to the primary coil L1, and an auxiliary coil L3. The secondary coil L2 and the auxiliary coil L3 are formed by winding such that the voltages generated in the secondary coil L2 and the auxiliary coil L3 have a polarity opposite to a polarity of the voltage generated in the primary coil L1. The primary coil L1 and the auxiliary coil L3 are provided on the input side (primary side), and the secondary coil L2 is provided on the output side (secondary side).

The control block 23 controls an inductor current IL1 flowing through the primary coil L1 on the primary side of the transformer 22, to thereby control the voltage generated in the secondary coil L2 on the secondary side of the transformer 22. As a result, an output voltage Vout of a target level is generated on the secondary side of the transformer 22.

The diode 24 rectifies an inductor current IL2 from the secondary coil L2 of the transformer 22, to supply the rectified current to the capacitor 25. The capacitor 25 is charged with the current from the diode 24, and thus the output voltage Vout is generated across the capacitor 25.

The voltage regulator circuit 26 generates a constant direct-current (DC) voltage, and is configured using a shunt regulator, for example.

The light-emitting diode 27 is a device that emits light of an intensity corresponding to the difference between the output voltage Vout and the output from the voltage regulator circuit 26, and configures a photocoupler together with a phototransistor 39, which will be described later. In an embodiment of the present disclosure, the higher the level of the output voltage Vout, the higher the intensity of the light from the light-emitting diode 27.

The resistor R1, the capacitor C1, and the diode D1 configure a snubber circuit. The snubber circuit restrains a surge voltage caused by a leakage inductance of the primary coil L1 when a power transistor 30 is off, thereby reducing the destruction of the power transistor 30. The snubber circuit is also coupled in parallel with the primary coil L1. The diode D1 has an anode coupled to the high potential side of the power transistor 30, which will be described later, and has a cathode coupled to the resistor R1. The capacitor C1 is coupled in parallel with the resistor R1.

The load 11 is a load coupled to the AC-DC converter 10, and the output voltage Vout is applied thereto. The current flowing through the load 11 is referred to as load current Iout.

<<<Overview of Control Block 23>>>

The control block 23 is a circuit block to control the AC-DC converter 10. The control block 23 includes the power transistor 30, resistors 31, 34, and 37, a control IC 32, capacitors 33, 35, and 38, a diode 36, and a phototransistor 39.

The power transistor 30 is an NMOS transistor to control the power to be supplied to the load 11. It is assumed in an embodiment of the present disclosure that the power transistor 30 is a metal oxide semiconductor (MOS) transistor, but is not limited thereto. The power transistor 30 may be a bipolar transistor or the like, for example, as long as the transistor is capable of controlling the power. The voltage on the high potential side of the power transistor 30 is referred to as voltage Vx.

The resistor 31 is to detect the inductor current IL1 flowing through the primary coil L1 when the power transistor 30 is on (i.e., the current flowing through the power transistor 30). The resistor 31 has one end coupled to a source electrode of the power transistor 30 and has the other end grounded.

The control IC 32 is an integrated circuit that controls switching of the power transistor 30 such that the level of the output voltage Vout reaches a target level. To be more specific, the control IC 32 drives the power transistor 30 based on the inductor current IL1 and the output voltage Vout.

As will be described later in detail, the control IC 32 has terminals CS, FB, OUT, and VCC. The power transistor 30 has a gate electrode coupled to the terminal OUT, and is driven by a drive voltage Vg. Although the control IC 32 has other terminals in practice, a description thereof is omitted for convenience of explanation.

The capacitor 33 is provided between the terminal CS and the ground, and is applied through the resistor 34 with the voltage of the resistor 31 generated with the inductor current IL1 flowing. The capacitor 33 and the resistor 34 configure a low-pass filter, to stabilize a voltage Vcs at the terminal CS.

The capacitor 38 is provided between the terminal FB and the ground to stabilize a voltage Vfb at the terminal FB. The voltage Vfb is a feedback voltage corresponding to the output voltage Vout, and is applied to the terminal FB. As will be described later in detail, the control IC 32 turns on the power transistor 30 at a frequency corresponding to the voltage Vfb. Then, in response to the voltage Vcs exceeding the voltage Vfb while the power transistor 30 is turned on, the control IC 32 turns off the power transistor 30.

In practice, the control IC 32 turns off the power transistor 30 in response to the voltage Vcs exceeding a voltage corresponding to k times of the voltage Vfb (where k is 1 or less). The same applies to the following description where the voltage Vcs exceeds the voltage Vfb or the voltage Vcs becomes equal to the voltage Vfb.

The phototransistor 39 is provided between the terminal FB and the ground, to receive light from the light-emitting diode 27. In response to an increase in the intensity of the light emitted by the light-emitting diode 27, the phototransistor 39 causes a larger sink current Ia to flow through the terminal FB.

The capacitor 35 is provided between the terminal VCC and the ground. The diode 36 has an anode coupled to the auxiliary coil L3 and has a cathode coupled to the terminal VCC through the resistor 37.

The voltage Va generated in the auxiliary coil L3 is applied to the capacitor 35 through the diode 36 and the resistor 37, and the voltage of the capacitor 35 becomes equal to the power supply voltage Vcc of the control IC 32.

When the power transistor 30 is off, a voltage corresponding to the voltage Va of the auxiliary coil L3 is generated in the capacitor 35, and the voltage of the capacitor 35 is applied as the power supply voltage Vcc to the terminal VCC.

<<<Configuration of Control IC 32>>>

Figure 2:
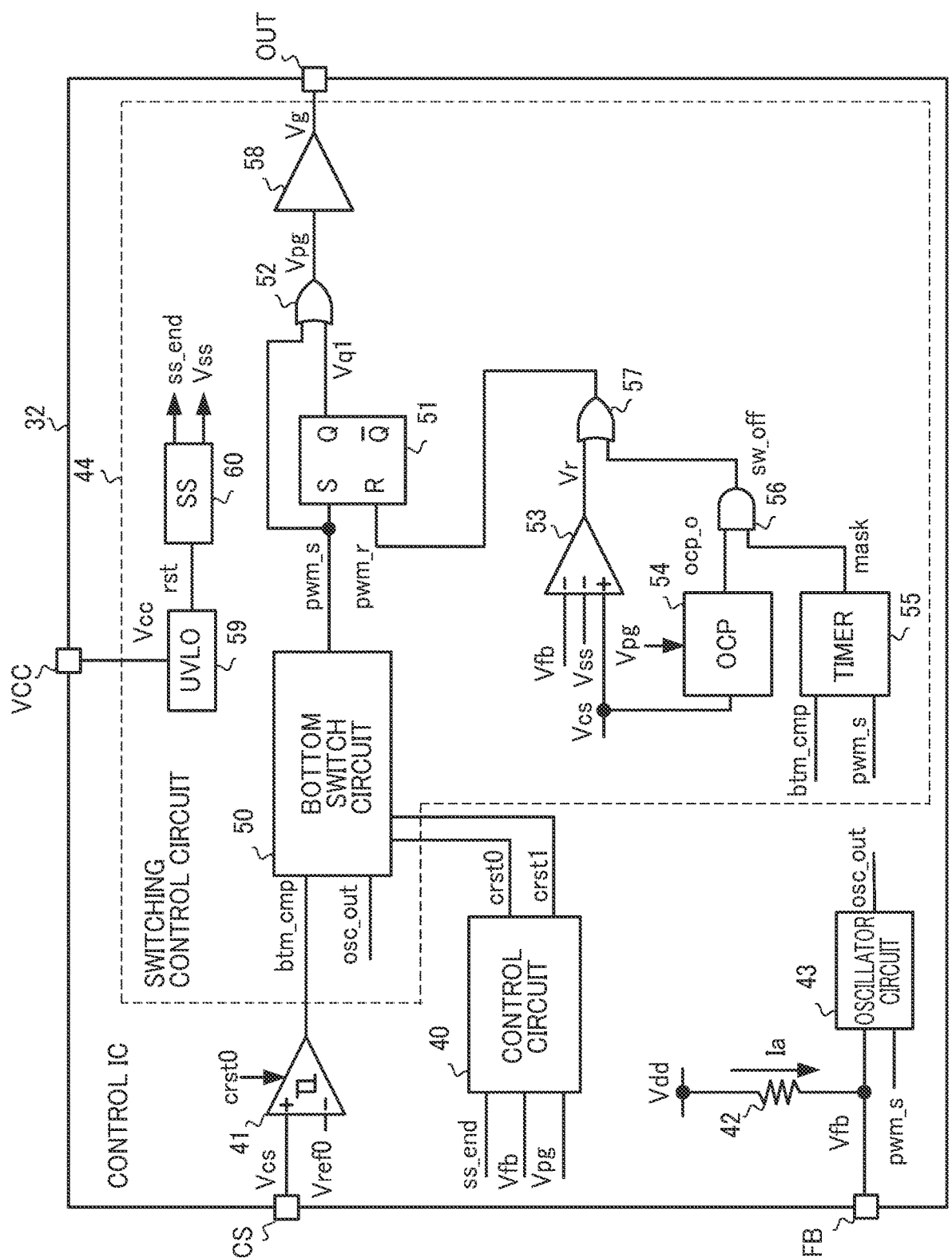
FIG. 2 is a diagram illustrating a configuration example of a control IC 32.

FIG. 2 is a diagram illustrating a configuration example of the control IC 32. The control IC 32 includes a control circuit 40, a hysteresis comparator 41, a resistor 42, an oscillator circuit 43, and a switching control circuit 44.

<<<Control Circuit 40 and Bottom Switch Circuit 50>>>

The bottom switch circuit 50, which will be described later, outputs a pulse signal pwm_s to turn on the power transistor 30 in response to the signal outputted from the control circuit 40 and the output from the hysteresis comparator 41.

As will be described in detail later, the bottom switch circuit 50 resets the internal state thereof in response to the signal crst0 from the control circuit 40. The bottom switch circuit 50 also changes the mode of outputting the pulse signal pwm_s having a predetermined minimum on-width in response to a signal btm_cmp and a signal crst1. Here, an overview of operations of the bottom switch circuit 50 will be first described, and a circuit configuration of the bottom switch circuit 50 will be described later in detail.

The control circuit 40 controls the bottom switch circuit 50, as illustrated in FIG. 3, with the hysteresis comparator 41. Here, in an embodiment of the present disclosure, the operations of the bottom switch circuit 50 are divided into operations under conditions A1 to A3 and an operation under a condition A4. Hereinafter, a detailed description will be given of a case where the conditions A1 to A4 are satisfied.

<<Condition A1>>

The condition A1 is satisfied when the AC-DC converter 10 and the AC-DC converter 12, which will be described later, are started. In this event, a soft start circuit (SS), which will be described later, outputs a low signal ss_end, and the hysteresis comparator 41 always outputs a low signal btm_cmp.

In this case, the AC-DC converters 10 and 12 are starting up, and thus the bottom switch circuit 50 outputs a pulse signal pwm_s upon receiving a pulse signal osc_out.

<<Condition A2>>

The condition A2 is satisfied in a steady state of the AC-DC converter 10 in which a predetermined external circuit is not coupled to the terminal CS. In this event, the soft start circuit outputs a high signal ss_end, but the hysteresis comparator 41 always outputs the low signal btm_cmp.

In this case, the hysteresis comparator 41 does not detect an oscillation of the voltage Vcs, and thus the bottom switch circuit 50 outputs the pulse signal pwm_s upon receiving the pulse signal osc_out, as in the case of the condition A1.

<<Condition A3>>

The condition A3 is satisfied when the load 11 is heavy (i.e., in the "first state") in the steady state of the AC-DC converter 12, which will be described later, in which the predetermined external circuit is coupled to the terminal CS. In this case, when the power transistor 30 is on, the hysteresis comparator 41 outputs a low signal btm_cmp. On the other hand, when the power transistor 30 is off, the hysteresis comparator 41 always outputs a high signal btm_cmp.

As will be described later in detail, in an embodiment of the present disclosure, the hysteresis comparator 41 does not detect an oscillation of the voltage Vcs in this case again, and thus the bottom switch circuit 50 outputs the pulse signal pwm_s upon receiving the pulse signal osc_out, as in the case of the condition A2.

<<Condition A4>>

The condition A4 is satisfied when the load 11 is light (i.e., in the "second state") in the steady state of the AC-DC converter 12, which will be described later, in which the predetermined external circuit is coupled to the terminal CS. In this case, when the power transistor 30 is off, the hysteresis comparator 41 outputs a high signal btm_cmp.

In this case, the hysteresis comparator 41 may detect an oscillation of the voltage Vcs. Thus, unlike the case of the conditions A1 to A3, the bottom switch circuit 50 may not immediately output the pulse signal pwm_s even if receiving the pulse signal osc_out. That is, the bottom switch circuit 50 may output the pulse signal pwm_s in response to the oscillation of the voltage Vcs.

That is, under the condition A4, the operation of the bottom switch circuit 50 may differ depending on the operation of the AC-DC converter 12. To be more specific, if the AC-DC converter 12 is in continuous operation, the bottom switch circuit 50 outputs the pulse signal pwm_s upon receiving the pulse signal osc_out. In this case, when the power transistor 30 is on, the hysteresis comparator 41 outputs a low signal btm_cmp. Meanwhile, when the power transistor 30 is off, the hysteresis comparator 41 always outputs a high signal btm_cmp.

On the other hand, when the AC-DC converter 12 is in discontinuous operation, the signal btm_cmp goes low after the pulse signal osc_out is received, and then the bottom switch circuit 50 outputs the pulse signal pwm_s at a predetermined timing. In this case, when the power transistor 30 is on, the hysteresis comparator 41 outputs a low signal btm_cmp. On the other hand, when the power transistor 30 is off, the hysteresis comparator 41 outputs a high or low signal btm_cmp according to the oscillation of the voltage Vcs.

The operation of the control circuit 40 will be described. The control circuit 40 changes the signals crst0 and crst1 according to the signals ss_end and Vpg and the voltage Vfb. To be more specific, the control circuit 40 outputs the signal crst0 to reset the internal circuits of the bottom switch circuit 50, to control the bottom switch circuit 50, as described above.

When the load 11 is heavy as in the case of the condition A3, the control circuit 40 outputs a high signal crst1 for causing the bottom switch circuit 50 to output the pulse signal pwm_s upon receiving the pulse signal osc_out.

On the other hand, when the load 11 is light as in the case of the condition A4, the control circuit 40 outputs a low signal crst1 for causing the bottom switch circuit 50 to output the pulse signal pwm_s according to the operation of the AC-DC converter 12.

Thus, in a case where the load 11 is heavy, the bottom switch circuit 50 can turn on the power transistor 30 irrespective of the voltage Vx, in response to the oscillator circuit 43 outputting the pulse signal osc_out. The operating state of the bottom switch circuit 50 changes depending on the logic level of the signal received. The circuit configuration of the bottom switch circuit 50 and the like will be described later in detail. Note that the control circuit 40 corresponds to a "first determination circuit".

<<<Hysteresis Comparator 41>>>

The hysteresis comparator 41 detects, with part of the bottom switch circuit 50, which will be described later, whether a predetermined external circuit is coupled between the terminal CS and the auxiliary coil L3. To be more specific, the hysteresis comparator 41 detects whether the foregoing predetermined external circuit (which will be described later in detail) is used by detecting the voltage Vcs at a time when the power transistor 30 is turned off.

The hysteresis comparator 41 is used to detect whether the current flowing through the primary coil L1 and the secondary coil L2 is continuous or discontinuous in the case where the predetermined external circuit is used. As will be described later in detail, the hysteresis comparator 41 detects the voltage Vcs at a time when the power transistor 30 is turned off, to thereby detect that oscillation corresponding to the voltage Vx occurs in the voltage Vcs when the current is discontinuous. The hysteresis comparator 41 produces, from a reference voltage Vref0, a threshold voltage VrefH for detecting whether the predetermined external circuit is coupled and a threshold voltage VrefL for detecting whether the current is continuous or discontinuous. In an embodiment of the present disclosure, the threshold voltage VrefH is higher than the threshold voltage VrefL.

To be more specific, the hysteresis comparator 41 operates when a control circuit 40, which will be described later, outputs a low signal crst0 when the power transistor 30 is off.

In the case where the predetermined external circuit is coupled to the terminal CS of the control IC 32, the voltage Vcs exceeds the threshold voltage VrefH when the power transistor 30 is off. Thus, when the voltage Vcs is higher than the threshold voltage VrefH, the hysteresis comparator 41 outputs a high signal btm_cmp. In this event, the hysteresis comparator 41 can detect that the predetermined external circuit is coupled to the terminal CS.

On the other hand, in the case where the control IC 32 is used in the AC-DC converter 10 and the predetermined external circuit is not coupled to the terminal CS, the voltage Vcs reaches the ground voltage when the power transistor 30 is off. Thus, the hysteresis comparator 41 outputs a low signal btm_cmp in response to the voltage Vcs being lower than the threshold voltage VrefL. In this event, the hysteresis comparator 41 can detect that the control IC 32 is used in the AC-DC converter 10.

Note that when the signal crst0 is high, the hysteresis comparator 41 outputs the low signal btm_cmp.

As will be described later in detail, when the predetermined external circuit is coupled to the terminal CS and, for example, the current of the secondary coil L2 becomes discontinuous (zero), the voltage Vcs oscillates with the oscillation of the voltage Vx. In this event, the hysteresis comparator 41 can detect that the voltage Vx oscillates by detecting that the voltage Vcs is lower than the threshold voltage VrefL. This enables the hysteresis comparator 41 to detect whether the voltage Vcs oscillates while the power transistor 30 is off. How the control IC 32 operates depending on whether the oscillation of the voltage Vcs is detected will be described later.

Note that the hysteresis comparator 41 corresponds to a "comparator circuit" or a "first comparator circuit", the voltage Vcs corresponds to a "first voltage", and the threshold voltage VrefL corresponds to a "second voltage". The signal btm_cmp corresponds to a "comparison result".

As will be described later in detail, when the control IC 32 is used in the AC-DC converter 12 (which will be described later) including an external circuit, the hysteresis comparator 41 outputs a high signal btm_cmp and operates in a "coupled state". On the other hand, when the control IC 32 is used in the AC-DC converter 10 of FIG. 1, the hysteresis comparator 41 outputs a low signal btm_cmp and operates in an "uncoupled state".

Thus, it can be determined, based on the detection result from the hysteresis comparator 41, whether the control IC 32 operates in the "uncoupled state" in which the predetermined external circuit is not coupled to the terminal CS or it operates in the "coupled state" in which the predetermined external circuit is coupled to the terminal CS.

Note that when the control IC 32 is used in the AC-DC converter 10, the control IC 32 operates in the "uncoupled state". Here, the "uncoupled state" means a state in which the voltage Vcs does not change according to the voltage Vx when the power transistor 30 is off. The "coupled state" will be described later in detail.

The resistor 50 is provided between the terminal FB and a node to receive an internal voltage Vdd generated from the power supply voltage Vcc, and generates a voltage Vfb corresponding to the sink current Ia passed by the phototransistor 39.

In an embodiment of the present disclosure, when the load 11 becomes heavy and the output voltage Vout drops, the sink current Ia decreases. As a result, the voltage Vfb rises. On the other hand, when the load 11 becomes light and the output voltage Vout rises, the sink current Ia increases. As a result, the voltage Vfb drops. Note that the phrase "the load 11 is heavy" means, for example, a case in which the current value of the load current Iout flowing through the load 11 is larger than a predetermined value (e.g., 5 A). On the other hand, the phrase "the load 11 is light" means, for example, a case in which the current value of the load current Iout flowing through the load 11 is smaller than the predetermined value (e.g., 5 A).

<<<Configuration and Operation of Oscillator Circuit 43>>>

The oscillator circuit 43 outputs a pulse signal osc_out having a frequency Fsw corresponding to the voltage Vfb. To be more specific, the oscillator circuit 43 outputs the pulse signal osc_out having a frequency Fsw1 higher than a frequency Fsw0, from the frequency Fsw0 according to the voltage Vfb. Note that the pulse signal osc_out corresponds to an "oscillator signal".

As will be described in detail later, upon receiving a pulse signal pwm_s to turn on the power transistor 30, the oscillator circuit 43 outputs a pulse signal osc_out at a timing at which an oscillation period corresponding to the frequency Fsw has elapsed since the reception of the pulse signal pwm_s. Note that the oscillation period corresponds to a "time period corresponding to the frequency of the oscillator signal".

Figure 4:
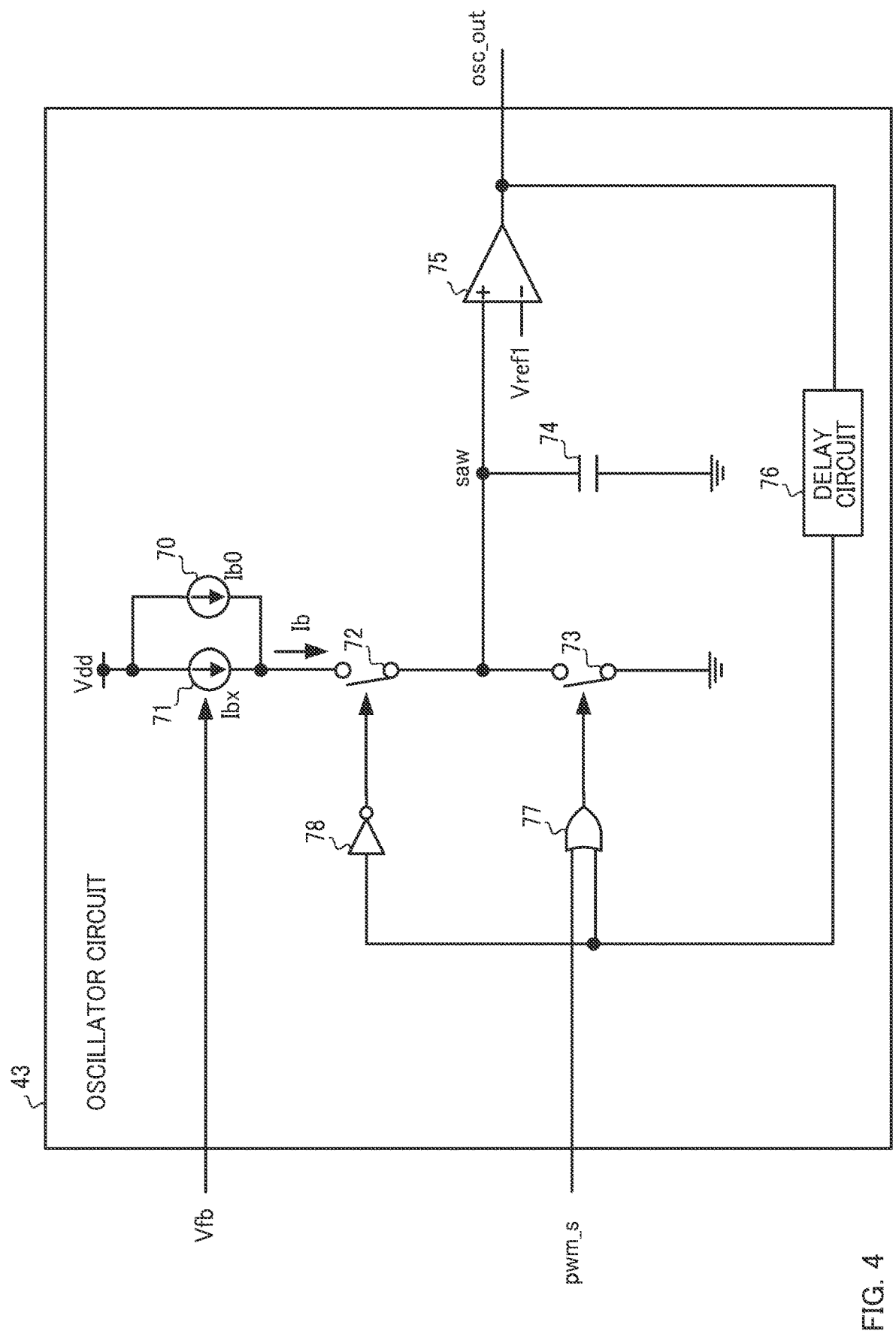
FIG. 4 is a diagram illustrating a configuration example of an oscillator circuit 43.
Figure 5:
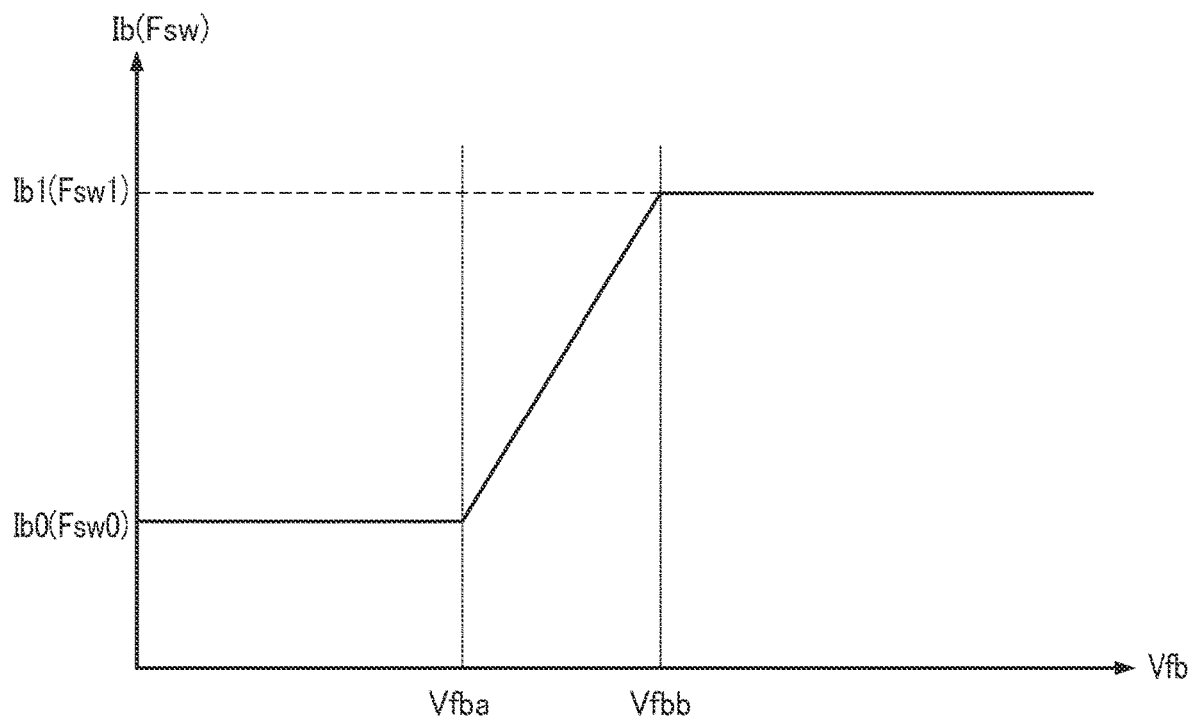
FIG. 5 is a diagram illustrating an example of a relationship between a feedback voltage Vfb, and a bias current Ib and an oscillation frequency Fsw.

FIG. 4 is a diagram illustrating a configuration example of the oscillator circuit 43, and FIG. 5 is a diagram illustrating an example of a relationship between the feedback voltage Vfb, and the current Ib and the oscillation frequency Fsw. The oscillator circuit 43 includes current sources 70 and 71, switches 72 and 73, a capacitor 74, a comparator 75, a delay circuit 76, an OR element 77, and an inverter 78.

The current source 70 is supplied with the internal voltage Vdd and supplies a constant current Ib0. Likewise, the current source 71 is supplied with the internal voltage Vdd and supplies a current Ibx corresponding to the voltage Vfb. The current Ib is a current obtained by adding up the constant current Ib0 and the current Ibx.

The current source 71 does not supply the current Ibx when the voltage Vfb is lower than Vfba. The current source 71 supplies a current Ibx that increases according to the voltage Vfb when the voltage Vfb is higher than Vfba and lower than Vfbb. When the voltage Vfb is higher than Vfbb, the current source 71 supplies a predetermined current as the current Ibx.

Thus, as illustrated in FIG. 5, the current Ib is the constant current Ib0 when the voltage Vfb is lower than Vfba, and increases as the current Ibx increases according to the voltage Vfb when the voltage Vfb is higher than Vfba and lower than Vfbb.

In response to the voltage Vfb becoming higher than Vfbb, the current Ibx reaches the predetermined current, resulting in the current Ib reaching a current Ib1, which is a constant current value.

The switches 72 and 73 are switched to charge and discharge the capacitor 74. The capacitor 74 is charged with the current Ib in response to turning on of the switch 72. On the other hand, the capacitor 74 is discharged in response to turning on of the switch 73.

The comparator 75 operates to compare a voltage saw of the capacitor 74 with the reference voltage Vref1, to thereby output a pulse signal osc_out. To be more specific, in response to turning on of the switch 72, the capacitor 74 is charged with the current Ib, and the voltage saw rises. In response to the voltage saw reaching the reference voltage Vref1, the comparator 75 outputs a high signal.

Then, the delay circuit 76 delays the signal from the comparator 75 by a predetermined time period, and outputs a resultant signal. Thus, in response to the comparator 75 outputting the high signal, the delay circuit 76 outputs the high signal after a lapse of a predetermined time period.

The OR element 77 calculates a logical sum of the signal from the delay circuit 76 and the pulse signal pwm_s, and switches the switch 73. To be more specific, in response to the delay circuit 76 outputting a high signal, the OR element 77 turns on the switch 73, to discharge the capacitor 74. In this event, the switch 72 is off. Thus, the voltage saw reaches the ground voltage.

Then, the comparator 75 outputs a low signal in response to the voltage saw dropping below the reference voltage Vref1. Accordingly, in response to the oscillation period having elapsed since turning on of the switch 72, that is, the voltage saw reaching the reference voltage Vref1, the comparator 75 outputs a pulse signal osc_out that is high for a certain time period.

This causes the oscillator circuit 43 to output the pulse signal osc_out having an oscillation frequency corresponding to the oscillation period, that is, the voltage Vfb. In response to the comparator 75 outputting the low pulse signal osc_out, the switch 72 is turned on because the signal from the delay circuit 76 goes low and the inverter 78 outputs a high signal.

Further, upon receiving the pulse signal pwm_s, the OR element 77 turns on the switch 73 to discharge the capacitor 74. In this event, the switch 72 remains on. Accordingly, the voltage saw reaches the ground voltage once and then rises. Accordingly, every time the power transistor 30 is turned on before the oscillation period has elapsed, the oscillator circuit 43 synchronizes the measurement of the oscillation period and starts again. That is, upon receiving the pulse signal pwm_s, the oscillator circuit 43 outputs the pulse signal osc_out at a timing at which the oscillation period corresponding to the frequency Fsw has elapsed since the reception of the pulse signal pwm_s.

The oscillation period of the oscillator circuit 43 is a period from when the switch 72 is turned on to when the comparator 75 outputs a high pulse signal osc_out, and is determined by the current value of the current Ib corresponding to the voltage Vfb. That is, the oscillation period becomes shorter as the current Ib increases, and becomes longer as the current Ib decreases.

Accordingly, the oscillation period becomes shorter in response to the load 11 becoming heavy, and becomes longer in response to the load 11 becoming light. Here, when the load 11 is heavy, the load current Iout is larger than a predetermined value. On the other hand, when the load 11 is light, the load current Iout is smaller than the predetermined value.

Accordingly, as illustrated in FIG. 5, in response to the voltage Vfb becoming lower than Vfba, the current Ib reaches the current Ib0 and the oscillation period becomes constant. Thus, the oscillator circuit 43 outputs a pulse signal osc_out having an oscillation frequency Fsw0.

On the other hand, in response to the voltage Vfb becoming higher than Vfba and lower than Vfbb, the current Ib increases with a rise in the voltage Vfb. Then, as the current Ib increases, the oscillation period gradually shortens. Thus, the oscillator circuit 43 outputs a pulse signal osc_out having an oscillation frequency that increases from Fsw0 to Fsw1.

In response to the voltage Vfb exceeding Vfbb, the current Ib reaches the current Ib1 irrespective of the voltage Vfb, and the oscillation period becomes constant. Thus, the oscillator circuit 43 outputs a pulse signal osc_out having the oscillation frequency Fsw1. Note that the comparator 75 corresponds to an "oscillator signal output circuit" and other circuits in the oscillator circuit 43 correspond to a "first timing circuit".

<<<Details of Switching Control Circuit 44>>>

The switching control circuit 44 includes a bottom switch circuit 50, an SR flip-flop 51, OR elements 52 and 57, a comparator 53, an overcurrent protection circuit (OCP) 54, a timer 55, an AND element 56, a buffer 58, an undervoltage protection circuit (UVLO) 59, and a soft start circuit (SS) 60. The switching control circuit 44 includes the bottom switch circuit 50 for convenience of explanation, but part of the bottom switch circuit 50 is included in a "second determination circuit".

<<<SR Flip-Flop 51>>>

The SR flip-Flop 51 outputs a signal Vq1 to switch the power transistor 30. To be more specific, the SR flip-Flop 51 outputs a high signal Vq1, in response to the bottom switch circuit 50 outputting the pulse signal pwm_s. On the other hand, the SR flip-Flop 51 outputs a low signal Vq1, in response to the OR element 57, which will be described later, outputting a high signal pwm_r.

The OR element 52 is provided to output a high signal Vpg during a time period during which a high pulse signal pwm_s having a minimum on-width is received. To be more specific, even if the SR flip-Flop 51 outputs a signal Vq1 having a pulse width shorter than the minimum on-width of the signal pwm_s, the OR element 52 calculates a logical sum of the signal pwm_s and the signal Vq1, to thereby output the signal Vpg having the minimum pulse width, that is, causes a buffer 58 (which will be described later) to output a drive signal Vg having the minimum pulse width.

Thus, the power transistor 30 is always on at least during a time period corresponding to the minimum on-width.

<<<Comparator 53>>>

The comparator 53 produces a timing at which the power transistor 30 is turned off. To be more specific, in startup of the AC-DC converter 10, the soft start circuit 60, which will be described later, outputs a voltage Vss that gradually rises in a stepwise manner. Then, the comparator 53 outputs a high signal Vr in response to the voltage Vcs exceeding the lower one of the voltage Vss and the voltage Vfb while the power transistor 30 is on.

That is, in startup, the comparator 53 outputs the high signal Vr in response to the voltage Vcs exceeding the voltage Vss. This causes the power transistor 30 to be turned off. Thus, the ON period of the power transistor 30 gradually increases with rising of the voltage Vss. As a result, the output voltage Vout also gradually rises. In response to a so-called soft start period having elapsed, the voltage Vss exceeds the voltage Vfb. As a result, during the steady state, the comparator 53 compares the voltage Vcs with the voltage Vfb.

In practice, the comparator 53 outputs a high signal Vr to turn off the power transistor 30 in response to the voltage Vcs exceeding a voltage corresponding to k times the voltage Vfb. The same applies to the following descriptions with the phrase "in response to the voltage Vcs exceeding the voltage Vfb" or "in response to the voltage Vcs reaching the voltage Vfb".

In response to the voltage Vcs exceeding the voltage Vfb, the comparator 53 outputs the high signal Vr. Thus, the power transistor 30 is turned off.

Irrespective of whether it is in startup or during the steady operation, the comparator 53 outputs the low signal Vr when the voltage Vcs is lower than the lower one of the voltage Vss and the voltage Vfb. Note that the comparator 53 corresponds to a "first off-signal output circuit" and the signal Vr corresponds to an "off-signal".

<<<Overcurrent Protection Circuit (OCP) 54>>>

The overcurrent protection circuit (OCP) 54 turns off the power transistor 30 upon detecting that an excessive inductor current IL1 is flowing through the power transistor 30. To be more specific, the overcurrent protection circuit 54 operates during a time period during which the comparator 53 is operating, and determines that the excessive inductor current IL1 is flowing through the power transistor 30 in response to the voltage Vcs exceeding a reference voltage Vref2, and outputs a high signal ocp_o. Thus, the overcurrent protection circuit 54 turns off the power transistor 30.

On the other hand, when the voltage Vcs is lower than the reference voltage Vref2, the overcurrent protection circuit 54 outputs a low signal ocp_o. The overcurrent protection circuit 54 also outputs the low signal ocp_o while the power transistor 30 is off (i.e., while the signal Vpg is low). Note that the overcurrent protection circuit 54 corresponds to an "overcurrent detection circuit".

<<<Timer 55 and Logic Circuit>>>

The timer 55 reduces malfunctions of the overcurrent protection circuit 54. In response to the timer 55 outputting a high signal mask, the AND element 56 outputs a signal ocp_o as a signal sw_off. On the other hand, in response to the timer 55 outputting a low signal mask, the AND element 56 outputs a low signal sw_off. The operation of the timer 55 will be described later in detail. Note that the timer 55 and the AND element 56 correspond to a "second off-signal output circuit", and the signal sw_off corresponds to an "off-signal".

The OR element 57 calculates a logical sum of the signal Vr and the signal sw_off, to output a signal pwm_r. To be more specific, the OR element 57 outputs a high signal pwm_r upon receiving a high signal Vr or a high signal sw_off.

On the other hand, when the signal Vr and the signal sw_off are low, the OR element 57 outputs a low signal pwm_r. Note that the comparator 53, the overcurrent protection circuit 54, the timer 55, the AND element 56, and the OR element 57 correspond to an "off signal output circuit".

<<<Buffer 58>>>

The buffer 58 amplifies the signal Vpg and outputs a resultant signal as a drive signal Vg. To be more specific, the buffer 58 outputs a high drive signal Vg, in response to the SR flip-Flop 51 outputting a high signal Vpg. On the other hand, the buffer 58 outputs a low drive signal Vg, in response to the SR flip-Flop 51 outputting a low signal Vpg.

<<<Under Voltage Protection Circuit (UVLO) 59>>>

The under voltage protection circuit (UVLO) 59 resets the control IC 32 when the power supply voltage Vcc is low, and stops the operation of the control IC 32. To be more specific, the under voltage protection circuit 59 outputs a high signal rst when the power supply voltage Vcc is lower than a predetermined voltage.

On the other hand, the under voltage protection circuit 59 outputs a low signal rst in response to the power supply voltage Vcc exceeding the predetermined voltage. The signal rst is outputted to various circuits in the control IC 32, and the various circuits are reset upon receiving the high signal rst, and start operating upon receiving the low signal rst.

<<<Soft Start Circuit (SS) 60>>>

The soft start circuit (SS) 60 gradually raises the output voltage Vout in startup of the AC-DC converter 10, to shift the AC-DC converter 10 to its steady state. To be more specific, the soft start circuit 60 gradually raises the voltage Vss in a stepwise manner, in response to the under voltage protection circuit 59 outputting the low signal rst.

The soft start circuit 60 outputs a low signal ss_end until when the soft start period has elapsed since the low signal rst is received from the under voltage protection circuit 59, and outputs a high signal ss_end in response to the soft start period having elapsed. The soft start period corresponds to a time period from the startup of the AC-DC converter 10 to the shift to the steady state.

<<<Operations of AC-DC Converter 10 and Control IC 32 during Continuous Operation in "Uncoupled State">>>

Figure 6:
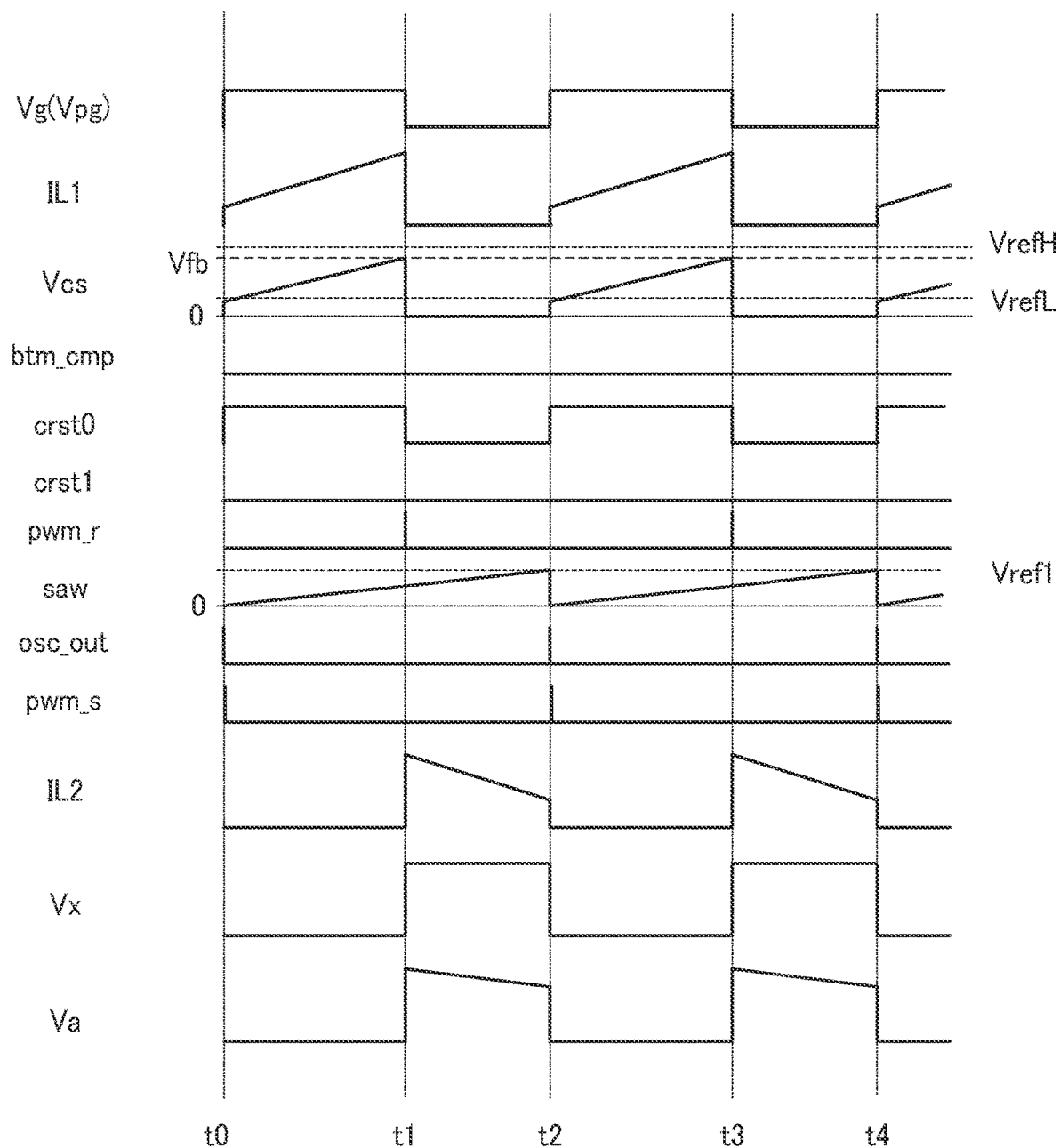
FIG. 6 is a diagram of an example of a timing chart illustrating operations of an AC-DC converter 10 and a control IC 32 during a continuous operation in an "uncoupled state".

FIG. 6 is a diagram of an example of a timing chart illustrating operations of the AC-DC converter 10 and the control IC 32 during a continuous operation in an "uncoupled state". Since FIG. 6 corresponds to the condition A2 of FIG. 3, the bottom switch circuit 50 operates irrespective of the operations of the hysteresis comparator 41 and the control circuit 40. In FIG. 6, it is also assumed that the AC-DC converter 10 performs a continuous operation in which either one of the inductor currents IL1 and IL2 is always flowing.

At time t0, the control IC 32 outputs a high-level (hereinafter referred to as high or high level) drive signal Vg, to thereby turn on the power transistor 30. In response to turning on of the power transistor 30, the inductor current IL1 flowing through the coil L1 on the primary side increases with a predetermined slope.

Thus, a voltage Vcs generated with the inductor current IL1 flowing through the resistor 31 also increases with the predetermined slope.

As described above, the hysteresis comparator 41 outputs a low signal btm_cmp irrespective of the voltage Vcs when the power transistor 30 is on. Here, the control circuit 40 outputs a high signal crst0, and thus the hysteresis comparator 41 outputs the low signal btm_cmp.

The coil L2 on the secondary side is electromagnetically coupled to the coil L1 on the primary side with the opposite polarity, and the diode 24 is turned off. Thus, the inductor current IL2 flowing through the coil L2 on the secondary side does not flow when the power transistor 30 is on, and energy is stored in the transformer 22. Then, when the power transistor 30 is turned on, the voltage Vx reaches a voltage corresponding to the inductor current IL1. However, the on-resistance of the power transistor 30 and the resistance 31 are sufficiently small here, and thus, in FIG. 6, the voltage Vx is given as being substantially equal to the ground voltage, for convenience.

Likewise, a current corresponding to the inductor current IL2 does not flow through the auxiliary coil L3, either, and thus the voltage Va of the auxiliary coil L3 also reaches the ground voltage.

The oscillator circuit 43 starts measuring an oscillation period in response to the capacitor 74 being charged and the voltage saw rising.

At time t1, in response to the voltage Vcs exceeding the voltage Vfb, the comparator 53 outputs a high signal Vr. This causes the OR element 57 to output a high signal pwm_r and the SR flip-Flop 51 outputs a low signal Vq1. Thus, the control IC 32 outputs a low drive signal Vg, and the power transistor 30 is turned off.

In response to turning off of the power transistor 30, the inductor current IL1 decreases sharply. In this event, the power transistor 30 is turned off, and thus the voltage Vcs reaches the ground voltage.

In addition, the signal Vpg goes low, and the control circuit 40 outputs a low signal crst0. Thus, the hysteresis comparator 41 starts operating. However, in the AC-DC converter 10 illustrated in FIG. 1, no external circuit is coupled between the auxiliary coil L3 and the terminal CS, and the voltage Vcs at the terminal CS is the ground voltage as described above. Accordingly, the voltage Vcs does not exceed the threshold voltage VrefH, and thus the hysteresis comparator 41 continues to output the low signal btm_cmp.

Further, in response to turning off of the power transistor 30, the energy stored in the transformer 22 is outputted from the coil L2 on the secondary side through the diode 24. In this event, the inductor current IL2 flows while decreasing with a predetermined slope. Here, the inductor current IL1 is zero, and thus the voltage Vx reaches a voltage corresponding to a rectified voltage Vrec, and the voltage Va of the auxiliary coil L3 electromagnetically coupled to the coil L2 reaches a voltage corresponding to the inductor current IL2 of the coil L2.

At time t2, in response to the voltage saw exceeding the reference voltage Vref1, the oscillator circuit 43 outputs a pulse signal osc_out. Then, as described above, the bottom switch circuit 50 outputs a pulse signal pwm_s in response to the pulse signal osc_out. Thus, the SR flip-Flop 51 outputs a high signal Vq1. Then, the buffer 58 outputs a high drive signal Vg, to thereby turn on the power transistor 30. Further, in the oscillator circuit 43, the capacitor 74 is discharged, and thus the voltage saw reaches the ground voltage.

Here, the inductor current IL2 has not yet reached 0 at time t2, but reaches 0 after the power transistor 30 is turned on and the inductor current IL1 flows. Note that the same operation as that for time t0 to t1 is repeated from time t2.

Accordingly, when the power transistor 30 is on during the continuous operation, the AC-DC converter 10 operates without the inductor current IL1 reaching zero. During the continuous operation, either the inductor current IL1 or the inductor current IL2 is flowing at any moment from time t0 to time t2.

<<<Operation of AC-DC Converter 10 during Discontinuous Operation in "Uncoupled State">>>

Figure 7:
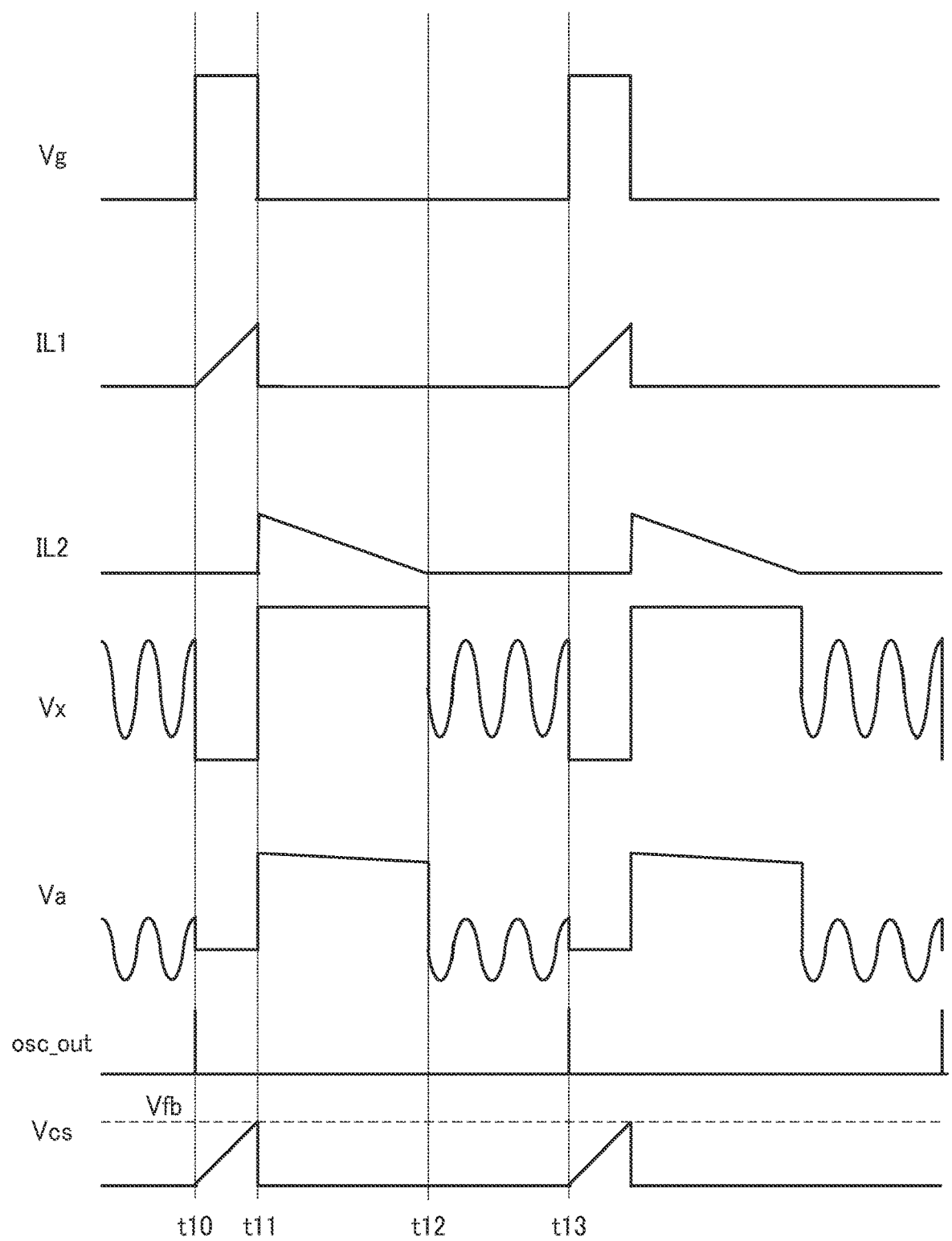
FIG. 7 is a diagram of an example of a timing chart illustrating an operation of an AC-DC converter 10 during a discontinuous operation in an "uncoupled state".

FIG. 7 is a diagram of an example of a timing chart illustrating the operation of the AC-DC converter 10 during a discontinuous operation in the "uncoupled state". It is assumed in FIG. 7 that the AC-DC converter 10 is operating in a steady state, and the voltage Vfb is lower than the voltage Vfbb.

Since the operation of the control IC 32 in FIG. 7 is the same as that of the control IC 32 in FIG. 6, a description of the operation of the control IC 32 is omitted. It is also assumed in FIG. 7 that the AC-DC converter 10 performs a discontinuous operation including a time period during which neither of the inductor currents IL1 and IL2 flows.

At time t10, the control IC 32 outputs a high drive signal Vg, to thereby turn on the power transistor 30. In response to turning on of the power transistor 30, the inductor current IL1 flowing through the coil L1 on the primary side increases from zero.

As such, when the AC-DC converter 10 performs the discontinuous operation, the inductor current IL1 increases from a state in which the current has flowed (i.e., zero). This causes the voltage Vcs generated with the inductor current IL1 flowing through the resistor 31 to also increase from the ground voltage (zero) as in the case of the inductor current IL1.

Meanwhile, the coil L2 on the secondary side is electromagnetically coupled with the opposite polarity and the diode 24 is turned off. Thus, the inductor current IL2 flowing through the coil L2 on the secondary side does not flow when the power transistor 30 is on, and energy is stored in the transformer 22. When the power transistor 30 is turned on, the voltage Vx reaches a voltage corresponding to the inductor current IL1. However, the on-resistance of the power transistor 30 and the resistance 31 are sufficiently small here, and thus, in FIG. 6, the voltage Vx is given as being substantially equal to the ground voltage, for convenience.

Likewise, a current corresponding to the inductor current IL2 does not flow through the auxiliary coil L3, and thus the voltage Va of the auxiliary coil L3 reaches the ground voltage.

At time t11, in response to the voltage Vcs exceeding the voltage Vfb, the control IC 32 outputs a low drive signal Vg, to turn off the power transistor 30.

In response to turning off of the power transistor 30, the voltage Vx rises so as to be substantially equal to the rectified voltage Vrec. Thus, the inductor current IL1 decreases sharply and the voltage Vcs reaches the ground voltage. This causes the energy stored in the transformer 22 to be outputted from the coil L2 on the secondary side through the diode 24. In this event, the inductor current IL2 flows while decreasing at a constant rate. In this event, the voltage Va reaches a voltage corresponding to the inductor current IL2.

At time t12, the inductor current IL2 ends flowing. In this event, the voltage Vx starts to oscillate according to a resonance frequency of an LC circuit that includes the primary coil L1 and a parasitic capacitance between the drain and source of the power transistor 30.

Once the oscillation of the voltage Vx is started, the voltage Va generated in the primary coil L1 and the auxiliary coil L3 magnetically coupled to the secondary coil L2 also starts to oscillate around the voltage level of the ground voltage.

Then, at time t13 at which the period of the pulse signal osc_out of the oscillator circuit 43 has elapsed since time t10, the control IC 32 outputs a high drive signal Vg, to turn on the power transistor 30. When the power transistor 30 is turned on again as in the case of time t10, the inductor current IL2 is not flowing because the AC-DC converter 10 is performing the discontinuous operation.

The same operation is repeated from time t13. Accordingly, the AC-DC converter 10 operates such that the inductor current IL1 is zero when the power transistor 30 is turned on during the discontinuous operation. During the discontinuous operation, there is a time period during which neither of the inductor currents IL1 and IL2 flows substantially, such as a time period between time t12 and time t13.

Here, when the AC-DC converter 10 is performing the discontinuous operation, ringing (oscillation) occurs in the drain-source voltage (voltage Vx) of the power transistor 30 as illustrated in FIG. 7. Here, if the power transistor 30 is turned on while the level of the voltage Vx is high, the efficiency of the AC-DC converter 10 deteriorates. To be more specific, for example, when a capacitor (not illustrated) is coupled between the drain and source of the power transistor 30 as a measure against noise, electric charges are charged in a combined capacitance of the parasitic capacitance and the capacitor (not illustrated) between the drain and source of the power transistor 30 in response to rising of the level of the voltage Vx. Then, in response to turning on of the power transistor 30, the electric charges charged in the combined capacitance flow to the ground through the power transistor 30 and the resistor 31. Thus, the efficiency of the AC-DC converter 10 deteriorates by an amount corresponding to the electric charges charged in the combined capacitance.

However, in the AC-DC converter 10, the timing at which the power transistor 30 is turned on (e.g., t10 and t13) is determined based on the period of the pulse signal osc_out of the oscillator circuit 43 as described with reference to FIG. 7, for example. Accordingly, as described above, the power transistor 30 may be turned on at the timing at which the level of the voltage Vx is high, which may result in deterioration in efficiency.

Thus, switching of the power transistor 30 is controlled by using the voltage Va such that the power transistor 30 can be turned on at a point at which the level of the ringing voltage Vx is the minimum (hereinafter referred to as "bottom"). The following describes such an AC-DC converter 12 with reference to FIG. 8.

<<<Overview of AC-DC Converter 12>>>

Figure 8:
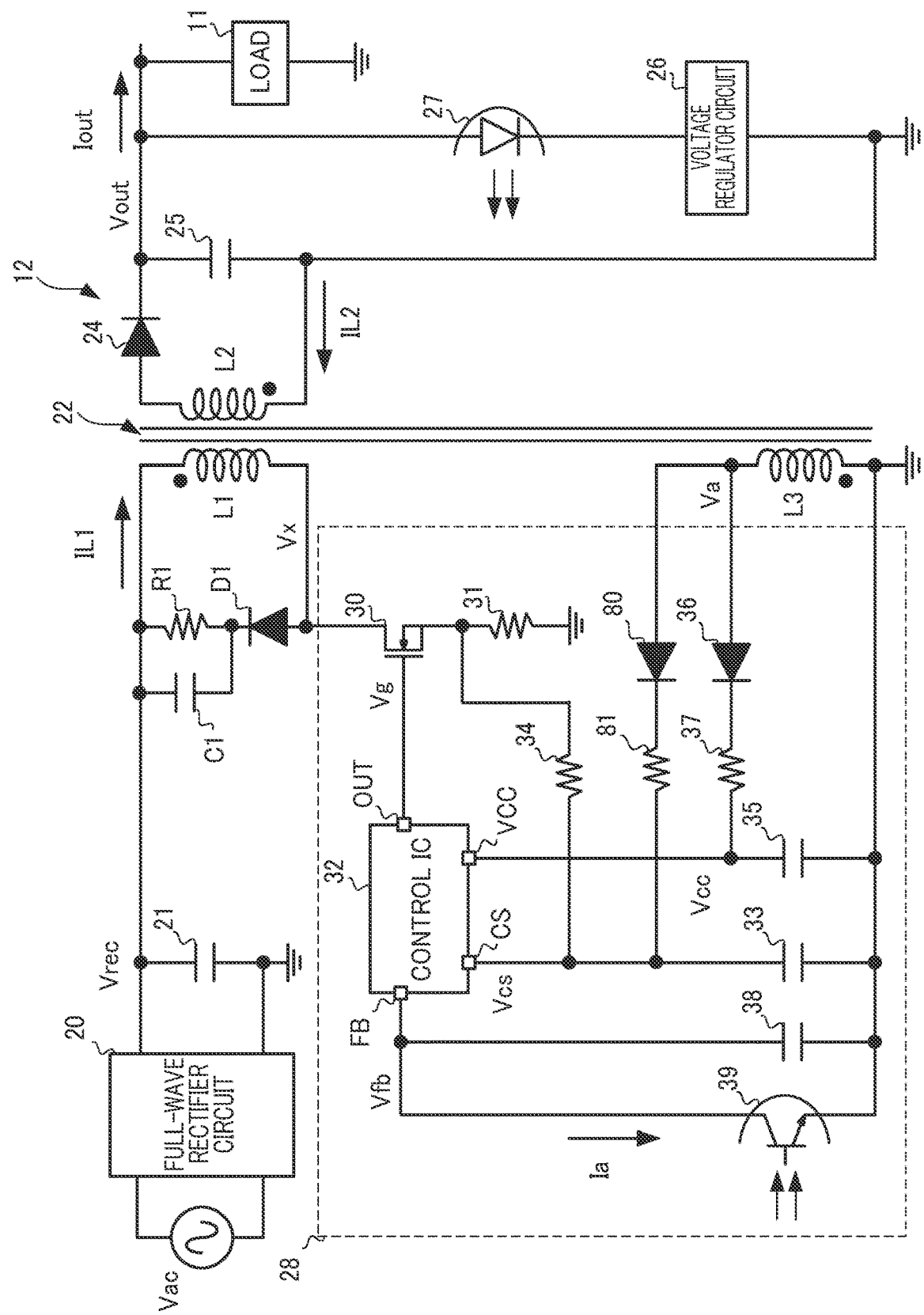
FIG. 8 is a diagram illustrating a configuration example of an AC-DC converter 12.

FIG. 8 is a diagram illustrating a configuration example of the AC-DC converter 12 according to an embodiment of the present disclosure. The AC-DC converter 12 is a circuit capable of turning on the power transistor 30 at the timing of the bottom of the voltage Vx during a so-called discontinuous operation.

A control block 28 of the AC-DC converter 12 according to an embodiment of the present disclosure includes a diode 80 and a resistor 81 for detecting the voltage of the auxiliary coil L3. Since the blocks given the same reference numerals are the same between FIGS. 1 and 8, the diode 80 and the resistor 81 will be mainly described here.

The diode 80 has an anode coupled to the auxiliary coil L3 and a cathode coupled to the terminal CS through the resistor

81. In response to a high voltage being generated in the auxiliary coil L3 and the diode 80 being turned on, the voltage Va is applied to the capacitor 33 through the diode 80 and the resistor 81.

When the power transistor 30 is on, a voltage generated in the resistor 31 is applied to the terminal CS. On the other hand, when the power transistor 30 is off, a voltage corresponding to the voltage Va of the auxiliary coil L3 is applied to the terminal CS. Thus, as will be described later in detail, the hysteresis comparator 41 can detect that the diode 80 and the resistor 81 are coupled to the terminal CS. Note that the diode 80 and the resistor 81 correspond to a "detection circuit".

The paths through which the capacitor 33 is discharged include a first path passing through the resistors 31 and 34 and a second path passing through the capacitance between the terminals of the diode 80, the resistor 81, and the auxiliary coil L3. In the second path, discharging of the capacitor 33 may be caused by a reverse recovery current in the diode 80 generated with the voltage Va becoming a negative voltage.

In response to turning on of the power transistor 30, the inductor current IL1 starts to flow through the resistor 31. Thus, a voltage corresponding to the inductor current IL1 is applied to the voltage Vcs.

On the other hand, in response to turning off of the power transistor 30, the inductor current IL2 starts to flow. Then, in response to the inductor current IL2 starting to flow, the voltage Va generated in the auxiliary coil L3 is applied to the voltage Vcs.

The AC-DC converter 12 performs a continuous or discontinuous operation as in the case of the AC-DC converter 10. In a case where the control IC 32 is in the "coupled state", the control IC 32 performs a "continuous operation" when the AC-DC converter 12 performs the continuous operation, and performs a "discontinuous operation" when the AC-DC converter 12 performs the discontinuous operation. The case where the AC-DC converter 12 performs the continuous operation is referred to as "continuous mode", and the case where the AC-DC converter 12 performs the discontinuous operation is referred to as "discontinuous mode". Further, the case where the control IC 32 is used in the AC-DC converter 10 (e.g., the case of the condition A2 in FIG. 3) corresponds to a "first case". When the control IC 32 is used in the AC-DC converter 12, the case of the "continuous mode" (the case of the "continuous mode" under the condition A4 in FIG. 3) corresponds to a "second case", and the case of the "discontinuous mode" (the case of the "discontinuous mode" under the condition A4 in FIG. 3) corresponds to a "third case".

When the power transistor 30 is turned off and the inductor current IL2 becomes discontinuous, the voltage Va generated in the auxiliary coil L3 oscillates around the voltage level of the ground voltage as described above. The voltage Va oscillates around the ground voltage, but the diode 80 is provided between the terminal CS and the auxiliary coil L3, and thus only a positive voltage of the oscillating voltage Va is applied to the terminal CS. The control IC 32 that operates based on the voltage Vcs will be described in detail below.

<<<Operation of Control IC 32 during "Continuous Operation">>>

Figure 9:
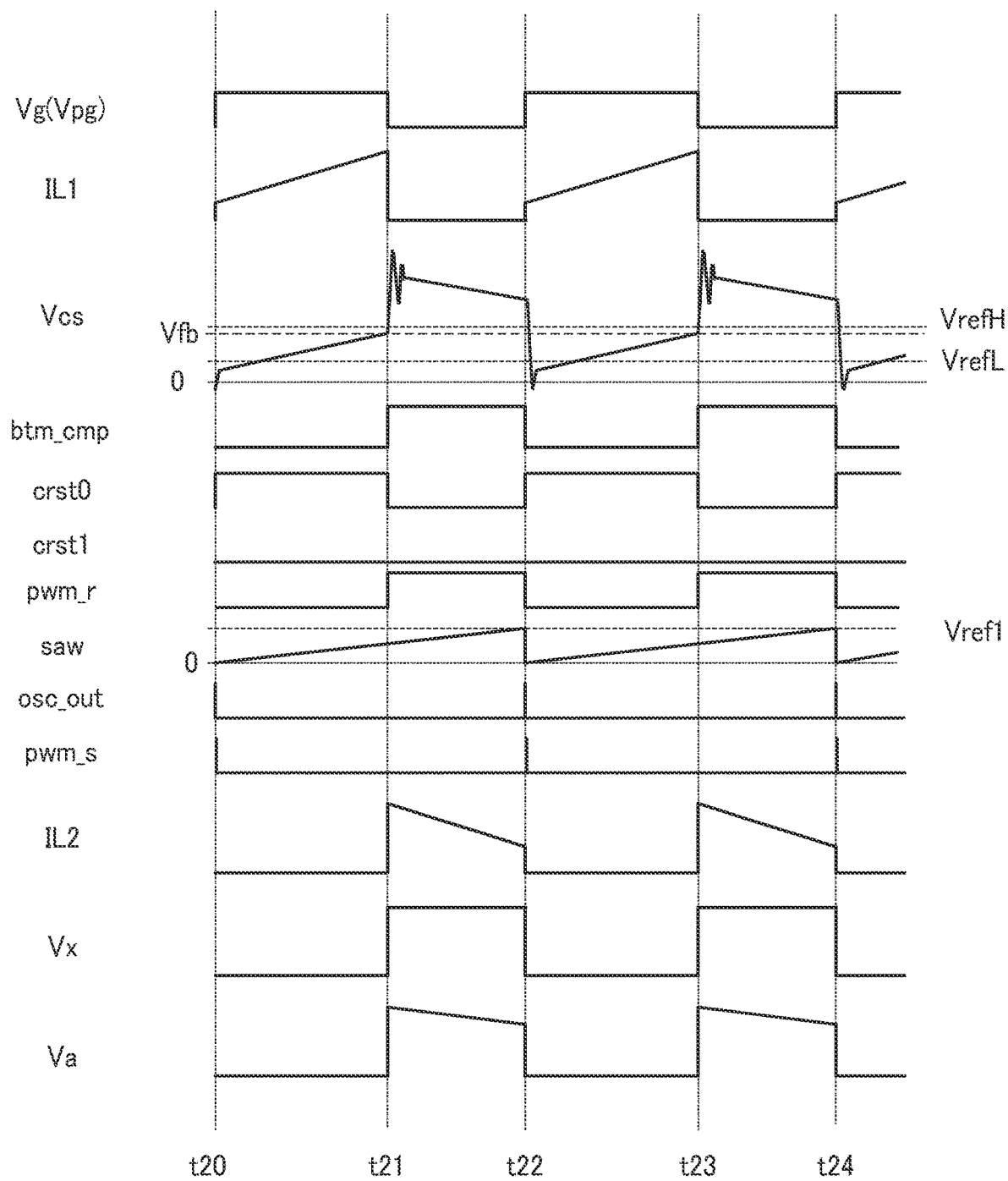
FIG. 9 is a diagram of an example of a timing chart illustrating operations of an AC-DC converter 12 and a control IC 32 during a "continuous operation".

FIG. 9 is a diagram of an example of a timing chart illustrating operations of the AC-DC converter 12 and the control IC 32 during the "continuous operation". FIG. 9 corresponds to the condition A4 in FIG. 3. It is assumed that the AC-DC converter 12 is designed such that the voltage Vcs corresponding to the voltage Va at a time when the power transistor 30 is turned off is higher than the threshold voltage VrefH of the hysteresis comparator 41.

Since the difference between the operation of the AC-DC converter 12 and the operation of the AC-DC converter 10 in FIG. 6 is only the difference in the voltage Vcs, the operation related to the voltage Vcs will be described below in detail. Since the control IC 32 of the AC-DC converter 12 is the same as the control IC 32 of FIG. 1, FIG. 2 is referred to as appropriate.

At time t20, in response to the control IC 32 outputting a high drive signal Vg, the power transistor 30 is turned on. In response to turning on of the power transistor 30, the inductor current IL1 flows. In this event, the voltage generated in the resistor 31 with the inductor current IL1 is applied to the terminal CS. Then, the voltage Vcs rises with a predetermined slope.

Further, in this event, the control circuit 40 of FIG. 2 outputs a high signal crst0. Because the signal crst0 is high, the hysteresis comparator 41 outputs a low signal btm_cmp.

At time t21, in response to the voltage Vcs exceeding the voltage Vfb, the control IC 32 outputs a low drive signal Vg, to thereby turn off the power transistor 30. In this event, a voltage Va corresponding to the inductor current IL2 is generated in the auxiliary coil L3, and a voltage corresponding to the voltage Va generated in the auxiliary coil L3 is applied to the terminal CS.

Further, the control circuit 40 also outputs a low signal crst0. Then, because the signal crst0 is low and the voltage Vcs is higher than the threshold voltage VrefH, the hysteresis comparator 41 outputs a high signal btm_cmp.

This enables the control IC 32 to determine, based on the signal btm_cmp, whether the auxiliary coil L3 is coupled to the terminal CS. That is, the control IC 32 can detect that the AC-DC converter 12 operates in the "coupled state".

At time t22, in response to the oscillator circuit 43 outputting a pulse signal osc_out, the control IC 32 outputs a high drive signal Vg, to thereby turn on the power transistor 30. Then, in response to turning on of the power transistor 30, the control circuit 40 outputs a high signal crst0. Because the signal crst0 is high, the hysteresis comparator 41 outputs a low signal btm_cmp. Then, the same operation is repeated from time t22.

<<<Malfunction of Overcurrent Protection Circuit 54>>>

In response to the control IC 32 outputting the high drive signal Vg, to thereby turn on the power transistor 30, the application of the voltage Va of the auxiliary coil L3 is stopped, as well as the capacitor 33 is discharged through the first or second path. Accordingly, in response to turning on of the power transistor 30, the voltage Vcs once drops to the ground voltage and then rises according to the inductor current IL1.

Figure 10:
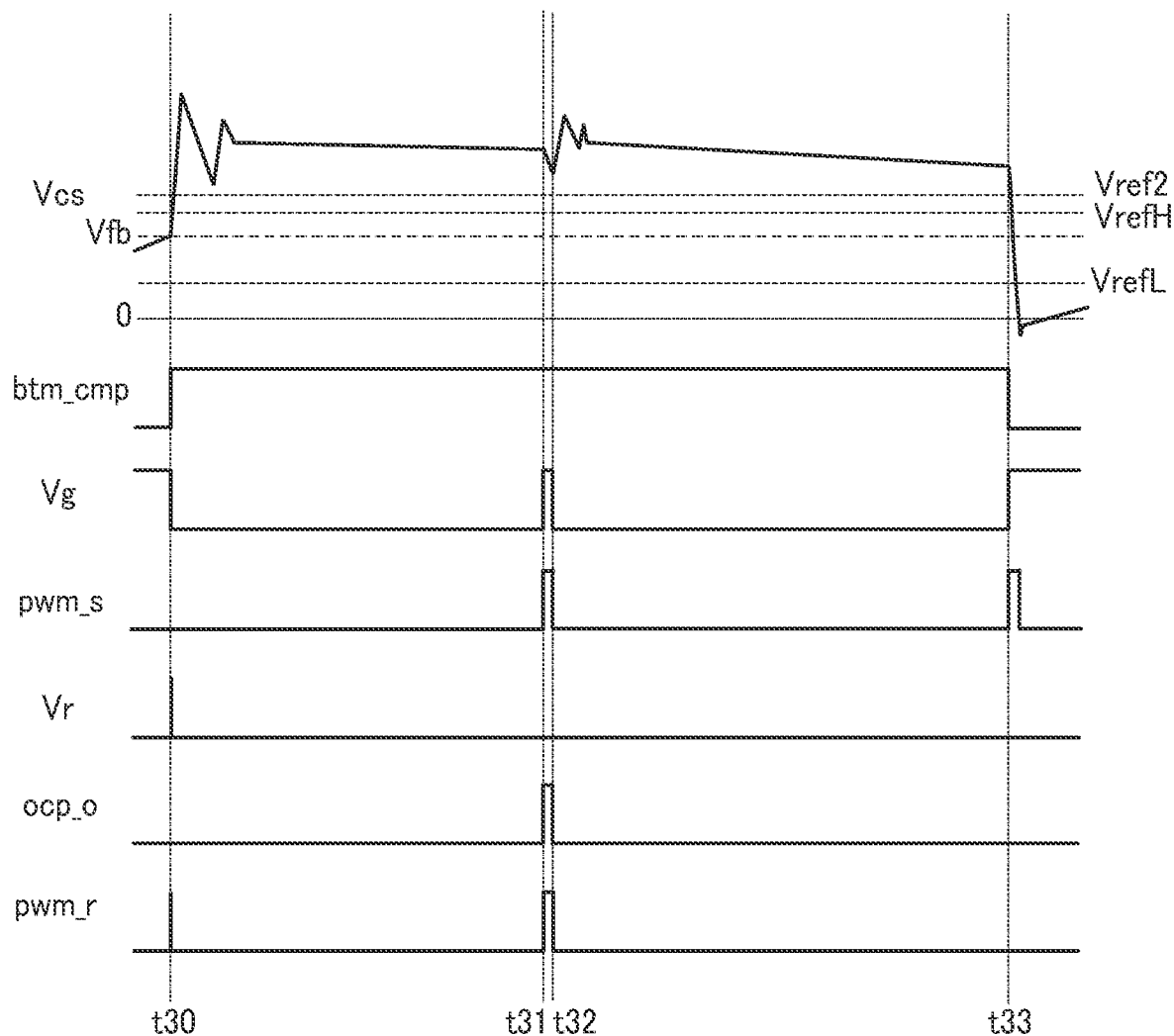
FIG. 10 is a diagram of an example of a timing chart illustrating a malfunction of an overcurrent protection circuit 54.

However, as illustrated in FIG. 10, due to some factor (e.g., in the case where the reverse recovery current of the diode 80 included in the second path does not flow), the voltage Vcs may not drop below the reference voltage Vref2 even when the power transistor 30 is turned on. Such a case will be described with reference to FIG. 10.

At time t30, in response to the voltage Vcs reaching the voltage Vfb and the comparator 53 of FIG. 2 outputting a high signal Vr, the control IC 32 outputs a low drive signal Vg, to thereby turn off the power transistor 30. In response to turning off of the power transistor 30, the control circuit 40 outputs a low signal crst0 as described above. Then, the voltage Vcs exceeds the reference voltage VrefH in response to rising of the voltage Va from the auxiliary coil L3, and thus the hysteresis comparator 41 outputs a high signal btm_cmp. Further, the overcurrent protection circuit 54 outputs a low signal ocp_o because the drive signal Vg goes low in response to the signal Vpg going low. Thus, the OR element 57 outputs a low signal pwm_r after turning off of the power transistor 30.

Then, at time t31, in response to the oscillator circuit 43 outputting a pulse signal osc_out and the bottom switch circuit 50 outputting a pulse signal pwm_s, the control IC 32 outputs a high drive signal Vg. However, since the voltage Vcs remains higher than the reference voltage Vref2 and the overcurrent protection circuit 54 outputs a high signal ocp_o, the OR element 57 outputs a high pwm_r.

Thus, at time t32, at which the period of the minimum on-width of the pulse signal pwm_s has elapsed since time t31, the SR flip-Flop 51 outputs a low signal Vq1 and the control IC 32 outputs a low drive signal Vg. Thus, the power transistor 30 is turned off immediately after being turned on. Further, the signal Vpg is low, and thus the overcurrent protection circuit 54 outputs a low signal ocp_o.

As such, if there is no circuit that invalidates the determination of an overcurrent by the overcurrent protection circuit 54 immediately after turning on of the power transistor 30, the power transistor 30 would be turned off immediately after being turned on.

At time t33, in response to the oscillator circuit 43 outputting a pulse signal osc_out and the bottom switch circuit 50 outputting a pulse signal pwm_s, the control IC 32 outputs a high drive signal Vg. In this event, in response to the voltage Vcs dropping below the reference voltage Vref2, the overcurrent protection circuit 54 outputs a low signal ocp_o. Thereafter, in response to the voltage Vcs dropping below the threshold voltage VrefL, the hysteresis comparator 41 outputs a low signal btm_cmp.

In order to reduce such malfunctions of the overcurrent protection circuit 54, a timer 55 is provided in the control IC 32 in an embodiment of the present disclosure. To be more specific, in response to the signal btm_cmp remaining high after receipt of the pulse signal pwm_s, the timer 55 outputs a low signal mask for a time period that is shorter one of a time period until the signal btm_cmp goes low and a time period until the predetermined time period P has elapsed.

On the other hand, the timer 55 outputs a high signal mask, in response to the signal btm_cmp going low after receipt of the pulse signal pwm_or to the predetermined time period P having elapsed since receipt of the pulse signal pwm_sd.

<<<Operation of Timer 55>>>

[In the Case where Time Period from when the Power Transistor 30 is Turned on to when the Voltage Vcs Reaches the Threshold Voltage VrefL is Shorter than a Predetermined Time Period P]

Figure 11:
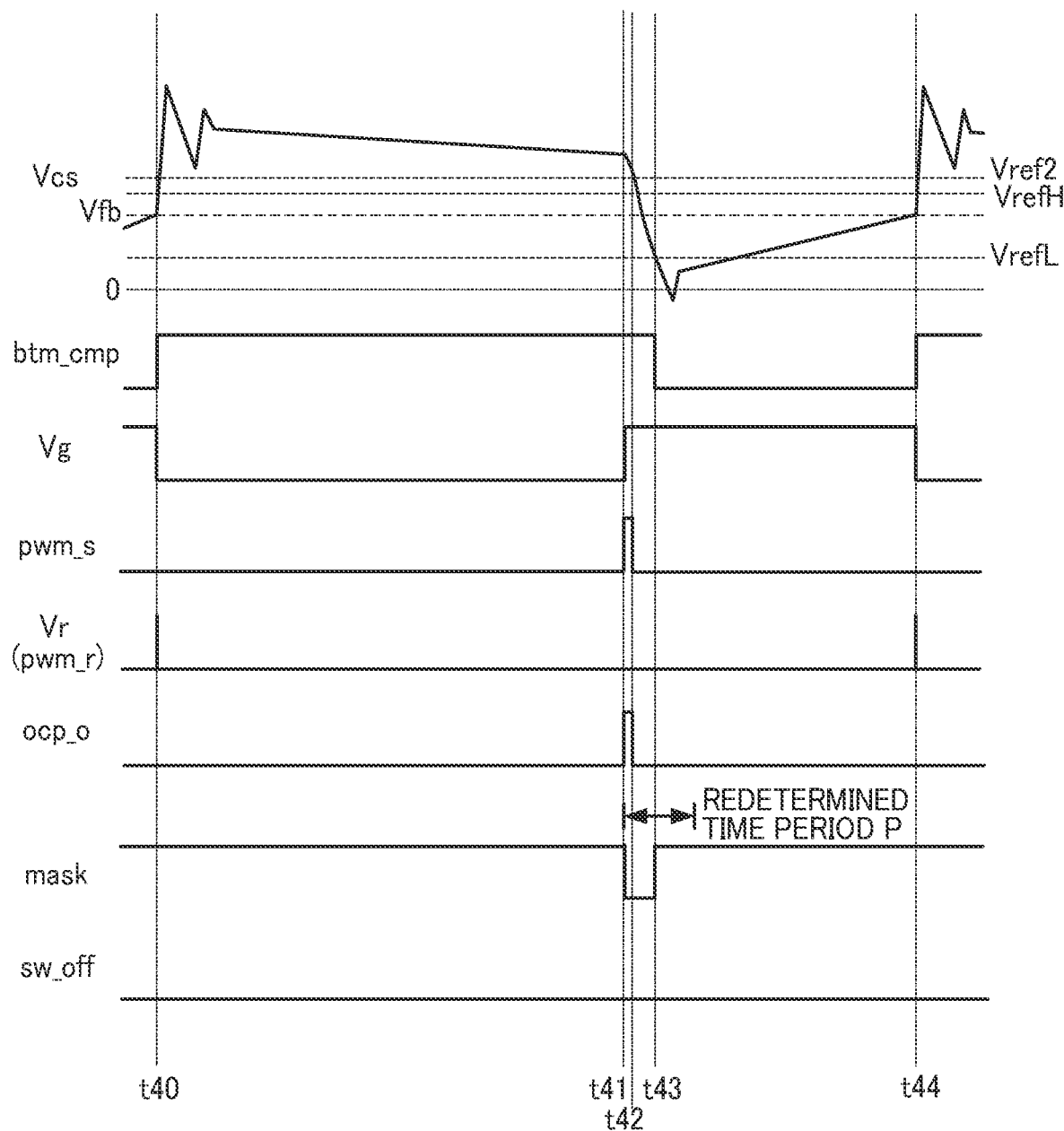
FIG. 11 is a diagram of an example of a timing chart illustrating an operation of reducing malfunctions of an overcurrent protection circuit 54 using a timer 55.
Figure 12:
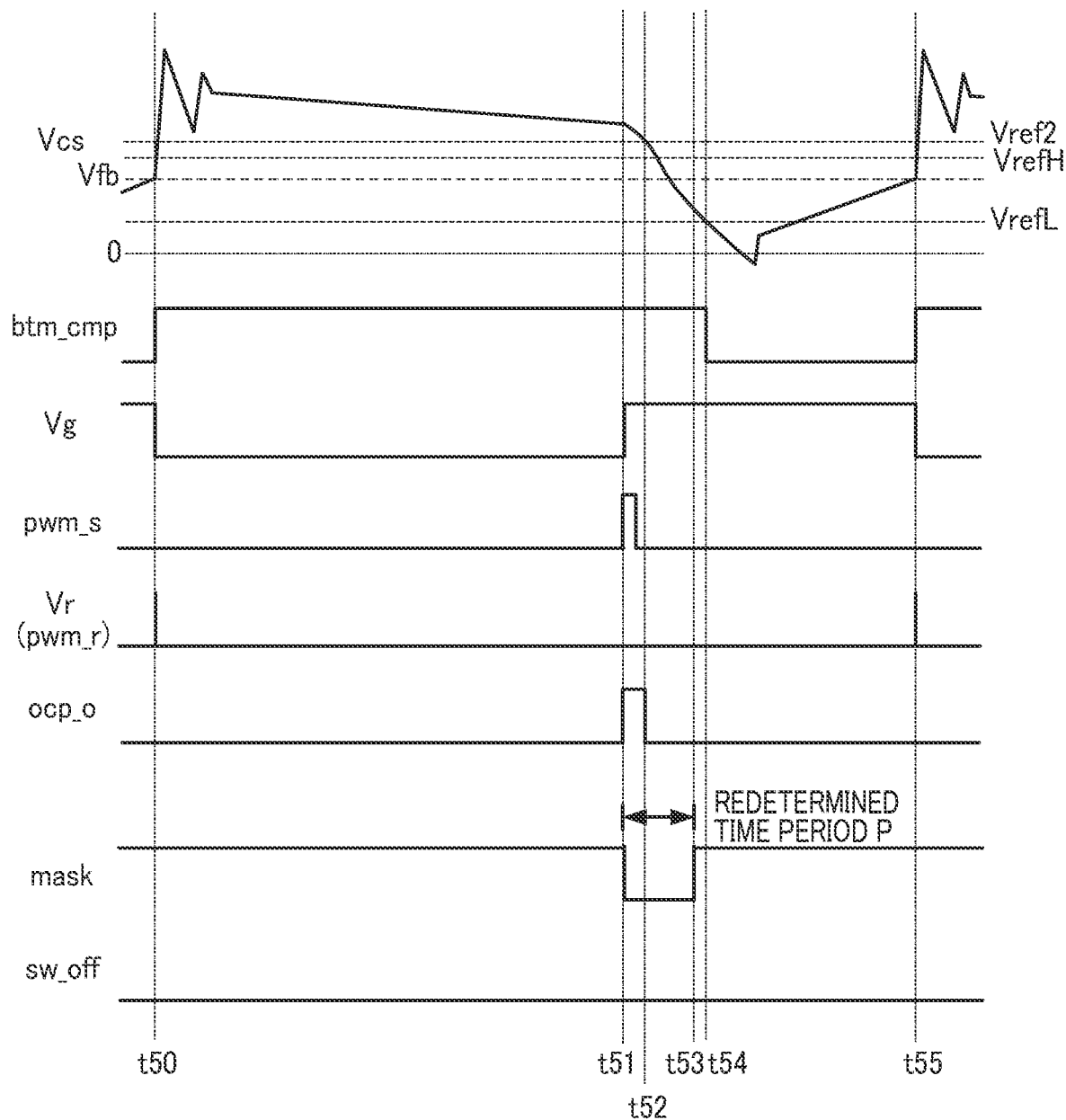
FIG. 12 is a diagram of an example of a timing chart illustrating an operation of reducing malfunctions of an overcurrent protection circuit 54 using a timer 55.

FIGS. 11 and 12 are diagrams of examples of timing charts illustrating operations of reducing malfunctions of the overcurrent protection circuit 54 using the timer 55. FIG. 11 is an example of a timing chart when the time period from when the power transistor 30 is turned on to when the voltage Vcs reaches the threshold voltage VrefL is shorter than the predetermined time period P.

In FIG. 11, it is assumed that the voltage Vcs is smaller than the reference voltage Vref2 when the predetermined time period P has elapsed, at most, since turning on of the power transistor 30. That is, it is assumed that the overcurrent protection circuit 54 outputs a low signal ocp_o before the predetermined time period P has elapsed, at most, since turning on of the power transistor 30.

In an embodiment of the present disclosure, as in FIG. 10, it is assumed, for convenience of explanation, that the comparator 53 outputs a high signal Vr in response to the voltage Vcs reaching the voltage Vfb, and then outputs a low signal Vr.

At time t40, in response to the voltage Vcs reaching the voltage Vfb and the comparator 53 of FIG. 2 outputting a high signal Vr, the control IC 32 outputs a low signal Vg, to thereby turn off the power transistor 30. And, in response to rising of the voltage Va from the auxiliary coil L3, the voltage Vcs exceeds the reference voltage VrefH, and thus the hysteresis comparator 41 outputs a high signal btm_cmp. Further, because the drive signal Vg goes low in response to the signal Vpg going low, the overcurrent protection circuit 54 outputs a low signal ocp_o. In this event, the timer 55 outputs a high signal mask, and thus the OR element 57 outputs a low signal pwm_r after turning off of the power transistor 30.

At time t41, in response to the oscillator circuit 43 of FIG. 2 outputting a pulse signal osc_out and the bottom switch circuit 50 outputting a pulse signal pwm_s, the control IC 32 outputs a high signal Vg, to thereby turn on the power transistor 30. In this event, the voltage Vcs is still higher than the reference voltage Vref2, and thus the overcurrent protection circuit 54 outputs a high signal ocp_o.

However, because the timer 55 outputs a low signal mask, the AND element 56 outputs a low signal sw_off. Thus, the OR element 57 outputs a low signal pwm_r.

This enables the control IC 32 to reduce malfunctions of the overcurrent protection circuit 54, because the voltage Vcs is higher than the reference voltage Vref2. Further, the timer 55 outputs the high signal mask, before the predetermined time period P has elapsed since turning on of the power transistor 30, and thus the control IC 32 can use the overcurrent protection function at an early stage.

At time t42, at which the voltage Vcs drops below the reference voltage Vref2, the overcurrent protection circuit 54 outputs a low signal ocp_o.

At time t43, at which the voltage Vcs further drops below the threshold voltage VrefL, the hysteresis comparator 41 outputs a low signal btm_cmp and the timer 55 outputs a high signal mask. In this event, because the overcurrent protection circuit 54 outputs a low signal ocp_o, the AND element 56 outputs a low signal sw_off. Thus, the OR element 57 outputs a low signal pwm_r.

At time t44 at which the voltage Vcs reaches the voltage Vfb, the comparator 53 outputs a high signal Vr. Then, the OR element 57 outputs a low signal pwm_r after the power transistor 30 is turned off.

[In the Case where the Time Period from when the Power Transistor 30 is Turned on to when the Voltage Vcs Reaches the Threshold Voltage VrefL is Longer than the Predetermined Time Period P]

On the other hand, FIG. 12 is an example of a timing chart when the time period from when the power transistor 30 is turned on to when the voltage Vcs reaches the threshold voltage VrefL is longer than the predetermined time period P. In FIG. 12 as well, similarly to FIG. 11, it is assumed that the overcurrent protection circuit 54 outputs a low signal ocp_o before the predetermined time period P has elapsed, at most, since turning on of the power transistor 30.

As in FIG. 11, it is also assumed that the comparator 53 outputs a high signal Vr. Since the operation from time t50 to time t51 in FIG. 12 is the same as the operation from time t40 to time t41 in FIG. 11, a description thereof is omitted.

After the control IC 32 outputs a high signal Vg, the overcurrent protection circuit 54 outputs a low signal ocp_o at time t52 at which the voltage Vcs drops below the reference voltage Vref2.

At time t53, at which the predetermined time period P has elapsed since time t51, the timer 55 outputs a high signal mask.

However, at time t52, the overcurrent protection circuit 54 outputs a low signal ocp_o, and thus the AND element 56 outputs a low signal sw_off. Accordingly, the OR element 57 outputs a low signal pwm_r.

This enables the control IC 32 to reduce malfunctions of the overcurrent protection circuit 54, because the voltage Vcs is higher than the reference voltage Vref2. Further, the timer 55 outputs a high signal mask in response to the predetermined time period P having elapsed since turning on of the power transistor 30, and thus the control IC 32 can use the overcurrent protection function when the predetermined time period P has elapsed, at most.

At time t54, at which the voltage Vcs drops below the threshold voltage VrefL, the hysteresis comparator 41 outputs a low signal btm_cmp.

At time t55, at which the voltage Vcs reaches the voltage Vfb, the comparator 53 outputs a high signal Vr. Then, the OR element 57 outputs a low signal pwm_r after the power transistor 30 is turned off.

The description has been given assuming that, in FIGS. 11 and 12, the overcurrent protection circuit 54 outputs the low signal ocp_o in response to the predetermined time period P has elapsed, at most, since turning on of the power transistor 30. However, when the overcurrent protection circuit 54 outputs a high signal ocp_o even after the predetermined time period P has elapsed, the power transistor 30 is turned off after the predetermined time period P has elapsed.

Thus, even if an overcurrent actually flows through the power transistor 30 due to some factor, the control IC 32 can turn off and protect the power transistor 30 when the state where the overcurrent flows lasts longer than the maximum predetermined time period P. Note that the predetermined time period P corresponds to a "predetermined time period".

<<<Configuration of Bottom Switch Circuit 50>>>

Figure 13:
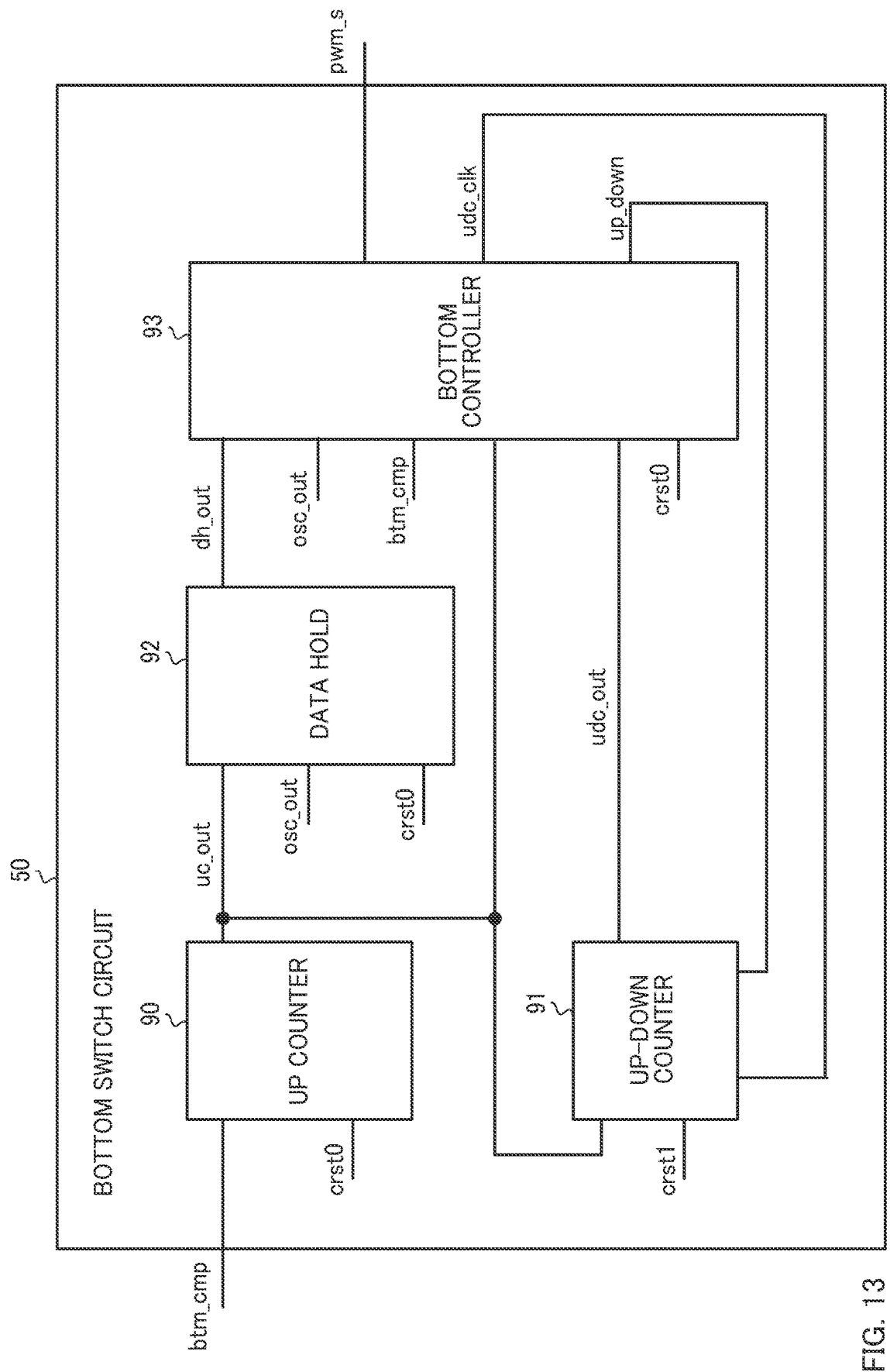
FIG. 13 is a diagram illustrating a configuration example of a bottom switch circuit 50.

FIG. 13 is a diagram illustrating a configuration example of the bottom switch circuit 50. The bottom switch circuit 50 outputs a pulse signal pwm_s to turn on the power transistor 30. To be more specific, the bottom switch circuit 50 outputs a pulse signal pwm_s in response to the oscillator circuit 43 outputting a pulse signal osc_out when the control IC 32 operates in the "uncoupled state" or performs the "continuous operation".

Meanwhile, the bottom switch circuit 50 outputs a pulse signal pwm_s in response to the outputs of the hysteresis comparator 41 and the control circuit 40. To be more specific, the bottom switch circuit 50 outputs a pulse signal pwm_s in response to the pulse signal osc_out and outputs of an up counter 90 and an up-down counter 91, which will be described later, when the control IC 32 performs a "discontinuous operation".

The bottom switch circuit 50 includes the up counter 90, the up-down counter 91, a data hold 92, and a bottom controller 93. The up counter 90 and the up-down counter 91 operate in response to the voltage Vcs oscillating when the control IC 32 performs the "discontinuous operation".

The up counter 90 counts the number of oscillations that occur in the voltage Vcs (i.e., a frequency of occurrence of the bottom (bottom frequency)). To be more specific, in response to the control circuit 40 outputting a low signal crst0, the up counter 90 counts up every time the hysteresis comparator 41 outputs a low signal btm_cmp.

Then, a count value obtained by counting up by the up counter 90 is outputted as a signal uc_out. This enables a determination circuit 110, which will be described later, to determine whether the control IC 32 performs a "continuous operation" or a "discontinuous operation", based on whether the signal uc_out is zero at the timing at which the pulse signal osc_out is received.

The up counter 90 is reset in response to the control circuit 40 outputting a high signal crst0. Here, the "bottom" means the timing at which the voltage Vx oscillates and reaches the lower limit during the discontinuous operation (see FIG. 16), and the "bottom count" means the number of times of occurrence of this timing. Note that the up counter 90 corresponds to a "counter". The value of the signal uc_out from the up counter 90 corresponds to a "first count".

The up-down counter 91 holds a reference frequency serving as a reference for turning on the power transistor 30 based on the bottom frequency. Further, the up-down counter 91 operates upon receiving a low signal crst1 from the control circuit 40, and resets the reference frequency held as the count value, upon receiving a high signal crst1 from the control circuit 40.

To be more specific, upon receiving a high signal up_down to instruct counting up from the bottom controller 93, which will be described later, and a clock signal udc_clk, the up-down counter 91 takes in the signal uc_out as the reference frequency (count value). Then, the up-down counter 91 outputs a resultant signal as a signal udc_out.

On the other hand, upon receiving the low signal up_down to instruct counting down and the clock signal udc_clk, the up-down counter 91 counts down to obtain the reference count (count value), and outputs the count value as the signal udc_out. Note that the up-down counter 91 corresponds to a "first holding circuit". The condition under which the up-down counter 91 takes in the reference count corresponds to a "first condition". The condition under which the up-down counter 91 counts down corresponds to a "second condition".

The data hold 92 holds the signal uc_out from the up counter 90 indicating the bottom count at the timing at which the pulse signal osc_out is received. To be more specific, upon receiving, from the control circuit 40, a low signal crst0 to release the reset of the data hold 92, and the pulse signal osc_out from the oscillator circuit 43, the data hold 92 takes in the signal uc_out and outputs the signal as a signal dh_out. Meanwhile, upon receiving a high signal crst0 from the control circuit 40, the datahold 92 is reset. Note that the datahold 92 corresponds to a "second holding circuit". The value of the signal dh_out from the data hold 92 corresponds to a "second count".

The bottom controller 93 outputs a pulse signal pwm_s to turn on the power transistor 30, a clock signal udc_clk and a signal up_down to control the bottom switch circuit 50. To be more specific, the bottom controller 93 changes the timing of outputting the pulse signal pwm_s depending on which one of the operations the control IC 32 performs among the operation in the "uncoupled state", the "continuous operation", and the "discontinuous operation".

Figure 14:
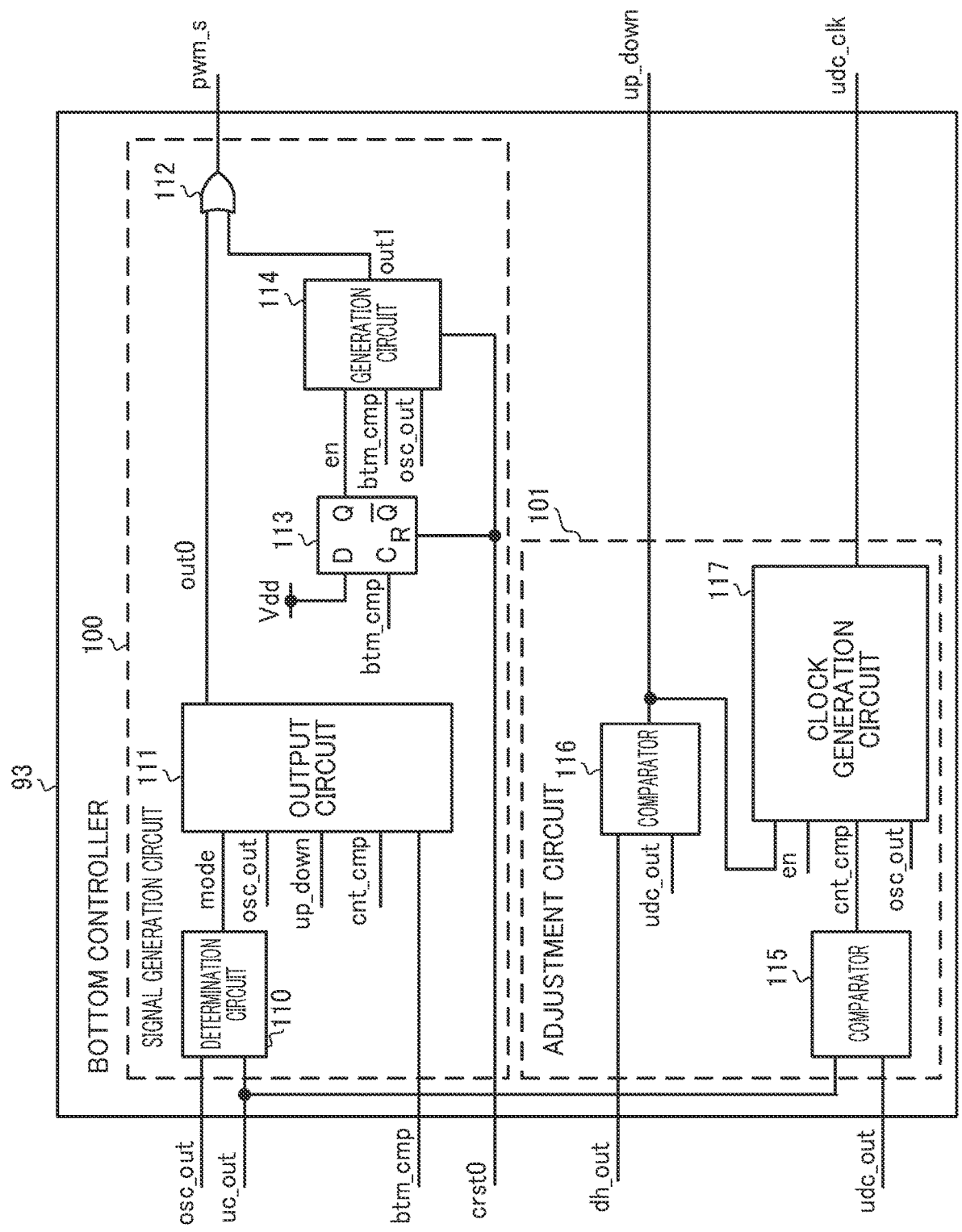
FIG. 14 is a diagram illustrating a configuration example of a bottom controller 93.

As illustrated in FIG. 14, the bottom controller 93 includes a signal generation circuit 100 and an adjustment circuit 101. The signal generation circuit 100 outputs a pulse signal pwm_s in response to the signal btm_cmp outputted by the hysteresis comparator 41. To be more specific, in the case where the control IC 32 operates in the "uncoupled state" or performs the "continuous operation", the signal generation circuit 100 outputs a pulse signal pwm_s in response to the oscillator circuit 43 outputting a pulse signal osc_out, as illustrated in FIG. 6.

In the case where the control IC 32 performs the "discontinuous operation", the signal generation circuit 100 outputs a pulse signal pwm_s according to a change in the signal btm_cmp, in response to the signal btm_cmp changing with the oscillation of the voltage Vcs. On the other hand, when the oscillation of the voltage Vcs disappears and the signal btm_cmp does not change, the signal generation circuit 100 outputs a pulse signal pwm_s in response to a predetermined time having elapsed. Note that the signal generation circuit 100 corresponds to an "on signal output circuit", and the signal pwm_s corresponds to an "on signal".

As illustrated in FIG. 14, the signal generation circuit 100 includes the determination circuit 110, an output circuit 111, an OR element 112, a D flip-flop 113, and a generation circuit 114. The determination circuit 110 determines whether the control IC 32 performs a "continuous operation" or a "discontinuous operation".

To be more specific, when the signal uc_out from the up counter 90 (i.e., the count value of the up counter 90) is zero upon receipt of the pulse signal osc_out from the oscillator circuit 43, the determination circuit 110 determines that the control IC 32 performs the "continuous operation" and outputs a low signal mode. On the other hand, when the signal uc_out from the up counter 90 is not zero upon receipt of the pulse signal osc_out from the oscillator circuit 43, the determination circuit 110 determines that the control IC 32 performs the "discontinuous operation" and outputs a high signal mode.

This enables the determination circuit 110 to determine whether the control IC 32 performs the "continuous operation" or "discontinuous operation", based on whether the signal uc_out is zero at the timing at which the pulse signal osc_out is received. When the control IC 32 operates in the "uncoupled state", the voltage Vcs does not oscillate and the signal uc_out from the up counter 90 is zero. Thus, the determination circuit 110 outputs a low signal mode. Note that the signal mode corresponds to a "determination result".

As illustrated in FIG. 15, the output circuit 111 changes the timing at which the pulse signal out0 is outputted, depending on which one of the operations is performed by the control IC 32 among the operation in the "uncoupled state", the "continuous operation", or "discontinuous operation".

To be more specific, under a condition B1 in FIG. 15, when the low signal mode is inputted to the output circuit 111, the control IC 32 operates in the "uncoupled state" or performs the "continuous operation", and thus the output circuit 111 outputs a pulse signal out0 in response to the oscillator circuit 43 outputting the pulse signal osc_out thereto. In this event, a switching frequency Ftr of the power transistor 30 is equal to the oscillation frequency Fsw.

On the other hand, under conditions B2 and B3 in FIG. 15, in the case where a high signal mode is inputted to the output circuit 111, the control IC 32 performs the "discontinuous operation", and thus the output circuit 111 outputs the pulse signal out0 at a predetermined timing after the oscillator circuit 43 outputs the pulse signal osc_out. In this event, the switching frequency Ftr is lower than the oscillation frequency Fsw.

Hereinafter, how the output circuit 111 determines the predetermined timing will be described in detail. The output circuit 111 changes the predetermined timing after the oscillator circuit 43 outputs the pulse signal osc_out, according to the logic level of the signal up_down.

To be more specific, first, the condition B2 will be described, where the signal up_down is high, that is, the oscillation frequency Fsw drops and the up-down counter 91 counts up. When the oscillator circuit 43 outputs the pulse signal osc_out, the output circuit 111 outputs the signal out0 after a predetermined delay, in response to the hysteresis comparator 41 outputting a low signal btm_cmp after the signal uc_out and the signal udc_out matching.

Next, the condition B3 will be described where the signal up_down is low, that is, the oscillation frequency Fsw increases and the up-down counter 91 counts down. If the signal uc_out is smaller than the signal udc_out when the oscillator circuit 43 outputs the pulse signal osc_out, the output circuit 111 waits until the signal uc_out matches the signal udc_out, and outputs the signal out0 after a predetermined delay.

Thus, when the load 11 becomes light, the control IC 32 can quickly respond to the change in the state of the load 11 and quickly change the switching frequency Ftr. On the other hand, when the load 11 becomes heavy, the control IC 32 restrains a sudden change in the switching frequency Ftr and restrains a sudden change in the inductor currents IL1 and IL2. Then, the control IC 32 restrains noise generation in the transformer 22.

The OR element 112 calculates a logical sum of the signal out0 from the output circuit 111 and a signal out1 from the generation circuit 114, which will be described later, and outputs the logical sum as a pulse signal pwm_s.

When the control circuit 40 outputs a low signal crst0, the D flip-flop 113 outputs a high signal en in response to the hysteresis comparator 41 outputting a high signal btm_cmp. On the other hand, the D flip-flop 113 is reset in response to the control circuit 40 outputting a high signal crst0. The signal en is used, in the generation circuit 114 and a clock generation circuit 117, as a signal indicating that the control IC 32 performs the "continuous operation" or "discontinuous operation".

The generation circuit 114 generates a timing for turning on the power transistor 30 when the oscillation of the voltage Vcs is reduced to such an undetectable level. To be more specific, when the voltage Vcs oscillates less than usual due to some factor and thereby the hysteresis comparator 41 can no longer detect the signal of the voltage Vcs and a predetermined time has elapsed, the generation circuit 114 outputs a pulse signal out1. The generation circuit 114 will be described later in detail.

The adjustment circuit 101 changes the reference frequency according to the load current Iout flowing through the load 11. The adjustment circuit 101 includes comparators 115 and 116 and the clock generation circuit 117.

The comparator 115 compares the count value of the up counter 90 with the count value of the up-down counter 91 in order to compare the current bottom frequency with the reference frequency. To be more specific, the comparator 115 outputs a high signal cnt_cmp in response to the signal uc_out and the signal udc_out matching, that is, the current bottom frequency and the reference frequency matching, and outputs a low signal cnt_cmp in response to the signal uc_out and the signal udc_out not matching, that is, the current bottom frequency and the reference frequency not matching.

The comparator 116 outputs a signal up_down indicating whether the up-down counter 91 should count up or down according to the signal udc_clk inputted to the up-down counter 91. To be more specific, the comparator 116 outputs a low signal up_down in response to the count value indicated by the signal udc_out being larger than the value obtained by adding 1 to the count value indicated by the signal dh_out (i.e., when the oscillation period of the oscillator circuit 43 in FIG. 2 becomes shorter).

On the other hand, the comparator 116 outputs a high signal up_down when the count value indicated by the signal udc_out is equal to or less than the value obtained by adding 1 to the count value indicated by the signal dh_out (i.e., when the oscillation period of the oscillator circuit 43 becomes longer). When the signal dh_out is zero (i.e., when the pulse signal osc_out is not inputted after the data hold 92 is reset), the comparator 116 does not perform the comparison and outputs a signal up_down of the same logic level as the logic level that has been outputted. When the signal udc_out is zero (i.e., when the up-down counter 91 is reset), the comparator 116 outputs a high signal up_down.

The clock generation circuit 117 generates a pulse signal udc_clk indicating a timing at which the up-down counter 91 updates the reference frequency. To be more specific, the clock generation circuit 117 operates when the signal en is high. Then, when the comparator 116 outputs the high signal up_down, the clock generation circuit 117 outputs a pulse signal udc_clk in response to the signal cnt_cmp going low.

In this event, upon receiving the pulse signal udc_clk, the up-down counter 91 takes in the signal uc_out and outputs a resultant signal as a signal udc_out. Thus, when the oscillation frequency Fsw decreases and the switching frequency Ftr of the power transistor 30 is reduced, the control IC 32 immediately increases the maximum bottom frequency in response to the reduction in the oscillation frequency Fsw. That is, the control IC 32 immediately reduces the switching frequency Ftr in response to the load 11 becoming light.

On the other hand, the clock generation circuit 117 outputs a pulse signal udc_clk, in response to the comparator 116 outputting the low signal up_down for a predetermined number of times after the pulse signal osc_out is inputted.

The following describes the operation when the signal up_down goes low, including circuits other than the clock generation circuit 117. First, in response to the oscillator circuit 43 outputting a pulse signal osc_out, the data hold 92 takes in a signal uc_out and outputs a resultant signal as a signal dh_out.

Next, the comparator 116 outputs a low signal up_down in response to the count value indicated by the signal udc_out being larger than a value obtained by adding 1 to the count value indicated by the signal dh_out. Then, in response to such an operation being repeated when the pulse signal osc_out is inputted for a predetermined number of times, the clock generation circuit 117 outputs a pulse signal udc_clk.

Then, upon receiving the pulse signal udc_clk, the up-down counter 91 counts down the count value and outputs a resultant value as a signal udc_out. Thus, the control IC 32 gradually reduces the reference frequency. As such, the condition under which the up-down counter 91 counts down is stricter than the condition under which the up-down counter 91 counts up.

Thus, when the oscillation frequency Fsw increases and the switching frequency Ftr of the power transistor 30 is increased, the control IC 32 gradually increases the switching frequency Ftr. That is, even when the load 11 becomes heavy, the control IC 32 gradually increases the switching frequency Ftr without immediately reflecting it in the switching frequency Ftr. This enables the control IC 32 to restrain a sudden change in the switching frequency Ftr and restrain noise generation in the transformer 22.

Note that the determination circuit 110 corresponds to a "mode determination circuit", the comparator 115 corresponds to a "second comparator circuit", and the comparator 116 corresponds to a "third comparator circuit". Thus, the hysteresis comparator 41, the up counter 90, and the determination circuit 110 correspond to a "second determination circuit". The clock generation circuit 117 corresponds to an "updating circuit".

<<<Operation of AC-DC Converter 12 during Discontinuous Operation>>>

Figure 16:
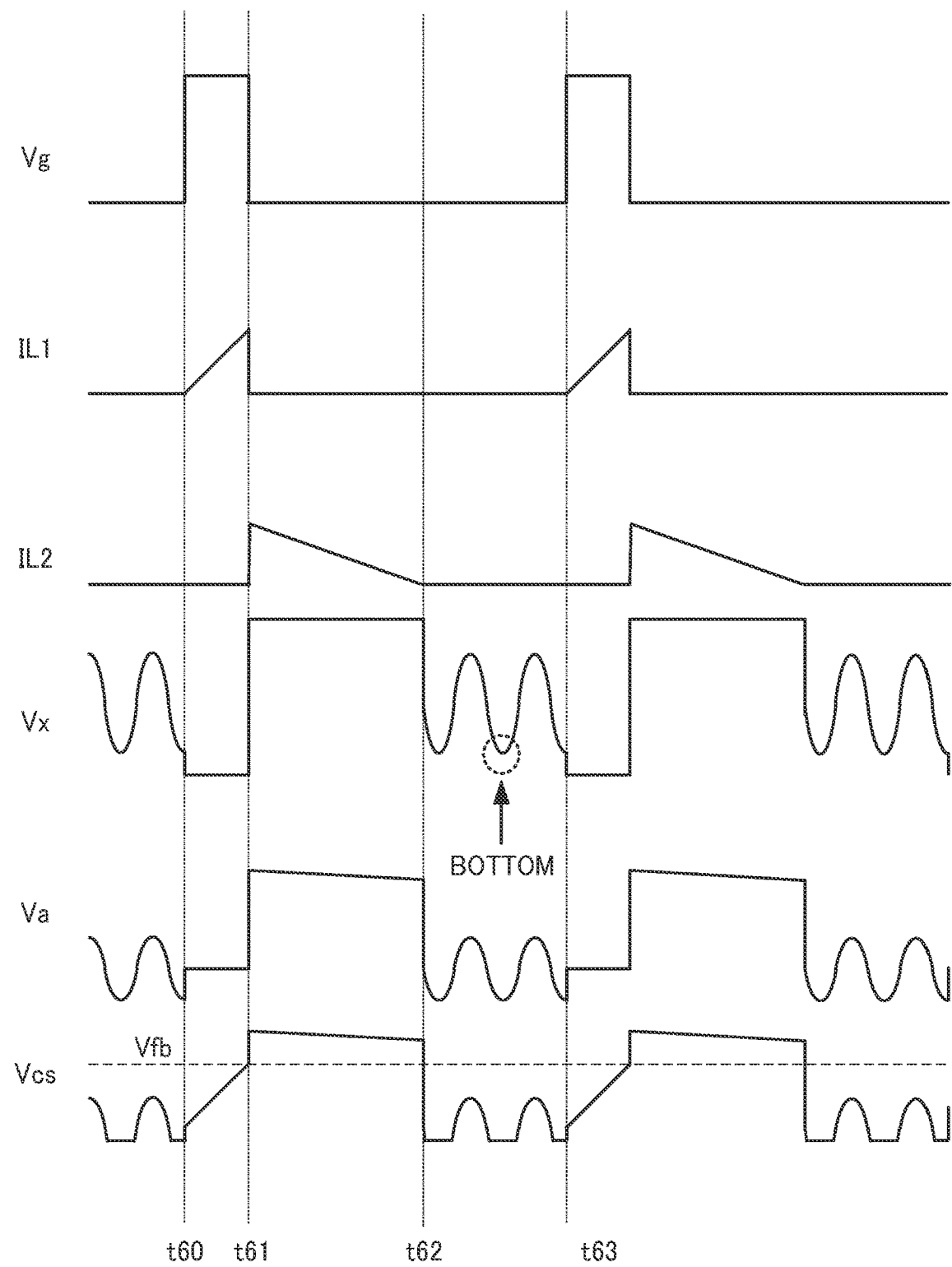
FIG. 16 is a diagram of an example of a timing chart illustrating an operation of an AC-DC converter 12 during a "discontinuous operation".

FIG. 16 is a diagram illustrating an example of an operation of the AC-DC converter 12 during a "discontinuous operation". In the AC-DC converter 12 of FIG. 8, the diode 80 and the resistor 81 are added to the AC-DC converter 10 in FIG. 1 such that a voltage corresponding to the voltage Va of the auxiliary coil L3 is applied to the terminal Vcs when the power transistor 30 is off. Thus, FIG. 16 is different from FIG. 7, which is during the discontinuous operation of the AC-DC converter 10, only in changes in the voltage Vcs. Accordingly, here, the changes in the voltage Vcs will be described below with reference to FIG. 16. Further, time t60 to t63 in FIG. 16 correspond to time t10 to t13 in FIG. 7. Note that, in FIG. 16, in order to help understanding the definition of the foregoing "bottom", the point corresponding to the timing at which the voltage Vx oscillates to reach the lower limit during the discontinuous operation is marked with a dotted circle.

In response to turning on of the power transistor 30 at time t60, the inductor current IL1 flowing through the coil L1 on the primary side increases because the AC-DC converter 12 is performing the discontinuous operation. Thus, the voltage Vcs once drops to the ground voltage, and then rises in the same manner as the inductor current IL1. Accordingly, the voltage Vcs also rises from zero.

At time t61, in response to the voltage Vcs exceeding the voltage Vfb, the control IC 32 outputs a low drive signal Vg, to thereby turn off the power transistor 30.

In addition, the voltage Vx becomes a voltage corresponding to the rectified voltage Vrec, and the voltage Va becomes a voltage corresponding to the inductor current IL2. In this event, the voltage Vcs becomes a voltage corresponding to the voltage Va.

At time t62, the voltage Va starts to oscillate around the voltage level of the ground voltage. Thus, the voltage Vcs also starts to oscillate. Since the voltage Va is applied to the terminal CS through the diode 80 and the resistor 81, the voltage Vcs becomes a negative voltage lower than the ground voltage substantially by an amount corresponding to a forward voltage of the diode 80, when the voltage Va becomes a negative voltage.

At time t63, the control IC 32 outputs a high drive signal Vg, to thereby turn on the power transistor 30. In this event, the voltage Vcs becomes a voltage generated in the resistor 31. The same operation is repeated from time t63.

<<<Operation when Oscillation Frequency Fsw Decreases in "Discontinuous Operation">>>

Figure 17:
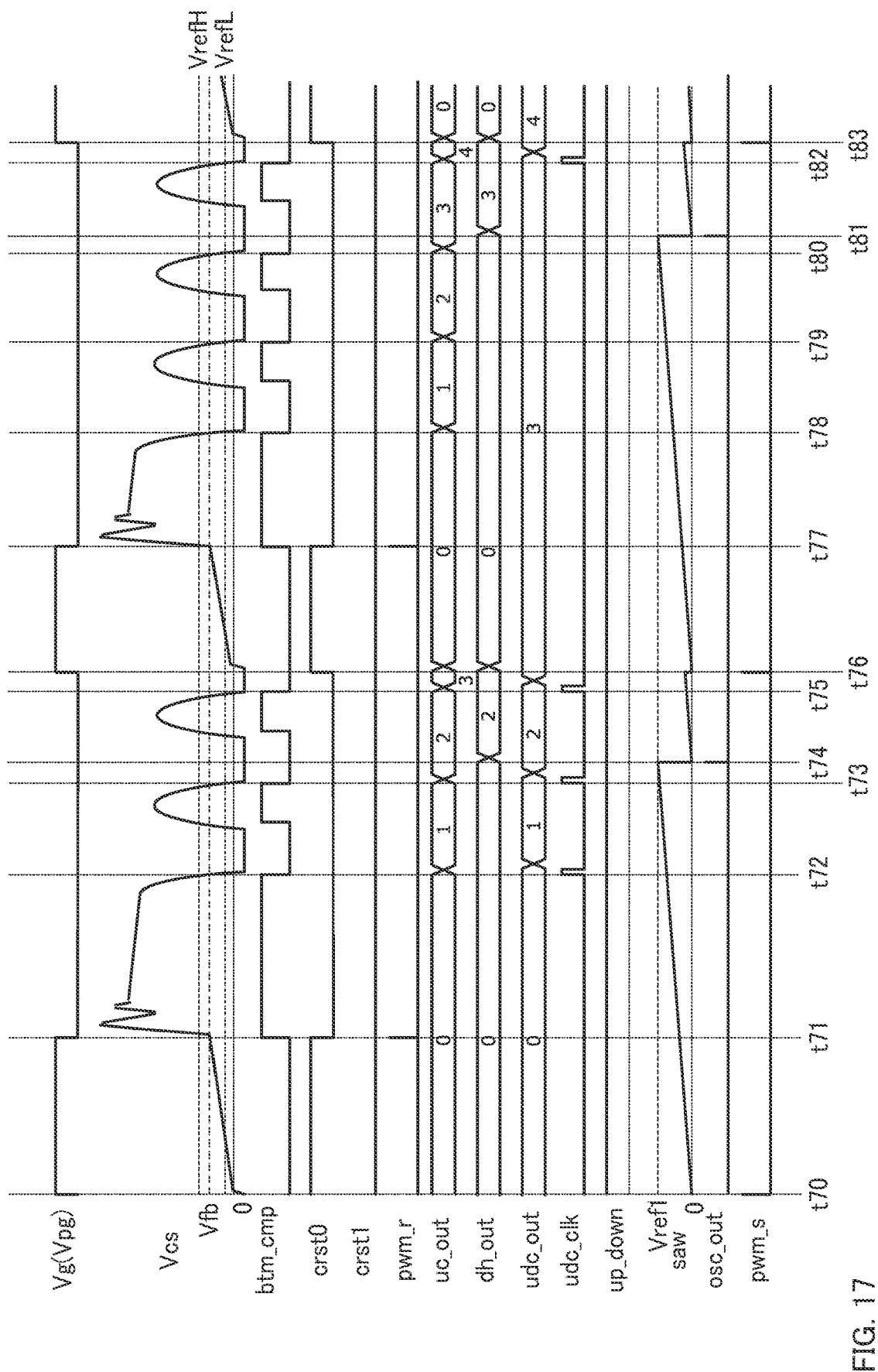
FIG. 17 is a diagram of an example of a timing chart illustrating an operation of a control IC 32 when an oscillation frequency Fsw decreases in a "discontinuous operation".

FIG. 17 is a diagram of an example of a timing chart illustrating an operation of the control IC 32 when the load 11 becomes light and the oscillation frequency Fsw decreases in the "discontinuous operation". Note that FIG. 17 corresponds to the condition A4 in FIG. 3. Time t70, t76, t83 in FIG. 17 corresponds to time t60, t63 in FIG. 16. Time t71, t77 in FIG. 17 corresponds to time t61 in FIG. 16. Time t72, t78 in FIG. 17 corresponds to time t62 in FIG. 16.

The changes in the signals btm_cmp, crst0, crst1, pwm_r, saw, and osc_out are as has been described above and thus will not be described in detail. It is also assumed that the up-down counter 91 has already been reset, and outputs a count value "0" as a signal udc_out before time t70.

At time t70, the control IC 32 outputs a high drive signal Vg, to thereby turn on the power transistor 30. In response to turning on of the power transistor 30, the voltage Vcs rises. In this event, the control circuit 40 outputs a high signal crst0 and the up counter 90 is reset. As a result, the count value (signal uc_out) of the up counter 90 reaches "0".

At time t71, at which the voltage Vcs rises and reaches the voltage Vfb, the comparator 53 outputs a high signal Vr and the OR element 57 outputs a high signal pwm_r, and thus the power transistor 30 is turned off. In response to turning off of the power transistor 30, the voltage Vcs rises according to the voltage Va from the auxiliary coil L3. Then, in response to the voltage Vcs exceeding the threshold voltage VrefH, the hysteresis comparator 41 outputs a high signal btm_cmp.

At time t72, at which the voltage Vcs drops below the threshold voltage VrefL, the hysteresis comparator 41 outputs a low signal btm_cmp. Then, the up counter 90 counts up in response to the low signal btm_cmp. As a result, the count value (signal uc_out) of the up counter 90 reaches "1".

In response to the up counter 90 counting up and the signal uc_out reaching "1", the signal uc_out exceeds the signal udc_out, and thus the clock generation circuit 117 outputs a pulse signal udc_clk. In this event, because the signal udc_out is equal to the signal dh_out, the comparator 116 outputs a high signal up_down. Thus, the up-down counter 91 takes in the signal uc_out as the signal udc_out and sets the count value (signal udc_out) to "1". Thereafter, the voltage Vcs starts oscillating (ringing).

At time t73, at which the voltage Vcs oscillates and drops below the threshold voltage VrefL, the hysteresis comparator 41 operates in the same manner as at time t72, and the up counter 90 sets the signal uc_out to "2" from "1". As a result, the up-down counter 91 changes the signal udc_out from "1" to "2" upon receiving the signal udc_clk.

At time t74, at which the oscillator circuit 43 outputs a pulse signal osc_out, the data hold 92 takes in the signal uc_out of the up counter 90 and outputs the signal as the signal dh_out. In this event, the signal uc_out and the signal udc_out match. That is, the reference frequency for determining the timing of turning on, which is a count value of the up-down counter 91, is equal to the frequency indicated by the signal dh_out when the pulse signal osc_out is inputted.

Then, at time t75, at which the voltage Vcs oscillates and drops below the threshold voltage VrefL, the hysteresis comparator 41 operates in the same manner as at time t72, the up counter 90 sets the signal uc_out to "3". Thereafter, the up-down counter 91 changes the signal udc_out from "2" to "3" in response to the signal udc_clk being inputted thereto.

The signal uc_out and the signal udc_out match when the pulse signal osc_out is received at time t74, and thus the bottom controller 93 outputs a pulse signal pwm_s at time t76 at which a waiting period has elapsed. And, the power transistor 30 is turned on. Because the pulse signal pwm_s is received, the oscillator circuit 43 then outputs a pulse signal osc_out, at a timing at which an oscillation period corresponding to the frequency Fsw has elapsed since the pulse signal pwm_s is received.

Thus, since the oscillator circuit 43 measures the oscillation period every time the power transistor 30 is turned on, a delay in the switching frequency Ftr can be prevented, even when the power transistor 30 is turned on according to the voltage Vx.

From time t76, the operation from time t70 to time t76 is repeated. However, from time t76, the signal udc_out which is a count value of the up-down counter 91 and indicates the reference frequency is "3". Here, from time t76, when the load current Iout of the load 11 further decreases, the time period during which the voltage Vcs exceeds the threshold voltage VrefH (time t77 to t78) becomes shorter than the time period from time t71 to time t72.

In such a case, the number of times the voltage Vcs oscillates increases. As a result, in response to the up counter 90 outputting a signal uc_out that is "4" at time t82, the signal udc_clk is received. Thus, the up-down counter 91 changes the signal udc_out from "3" to "4".

Then, at time t83, at which the waiting period has elapsed from time t82, the signal uc_out and the signal udc_out has matched since time t81 at which the pulse signal osc_out is received. Thus, the bottom controller 93 outputs a pulse signal pwm_s.

As such, as described in time t77 to t78, as the load current Iout decreases, the number of times the voltage Vcs oscillates increases. In such a case, if the signal udc_out, which is the count value of the up-down counter 91 and indicates the reference frequency, does not change from "3", the pulse signal pwm_s is outputted after the timing of time t80, resulting in a significant change in the period of the pulse signal pwm_s.

In an embodiment of the present disclosure, as the load current Iout decreases, the reference frequency also increases, and thus the period of the pulse signal pwm_s can be set substantially constant. As a result, it is possible to reduce noise generation in the primary coil L1 and/or the like caused by a sudden change in the period of the pulse signal pwm_s, for example.

<<<Operation When Oscillation Frequency Fsw Rises in "Discontinuous Operation">>>

Figure 18:
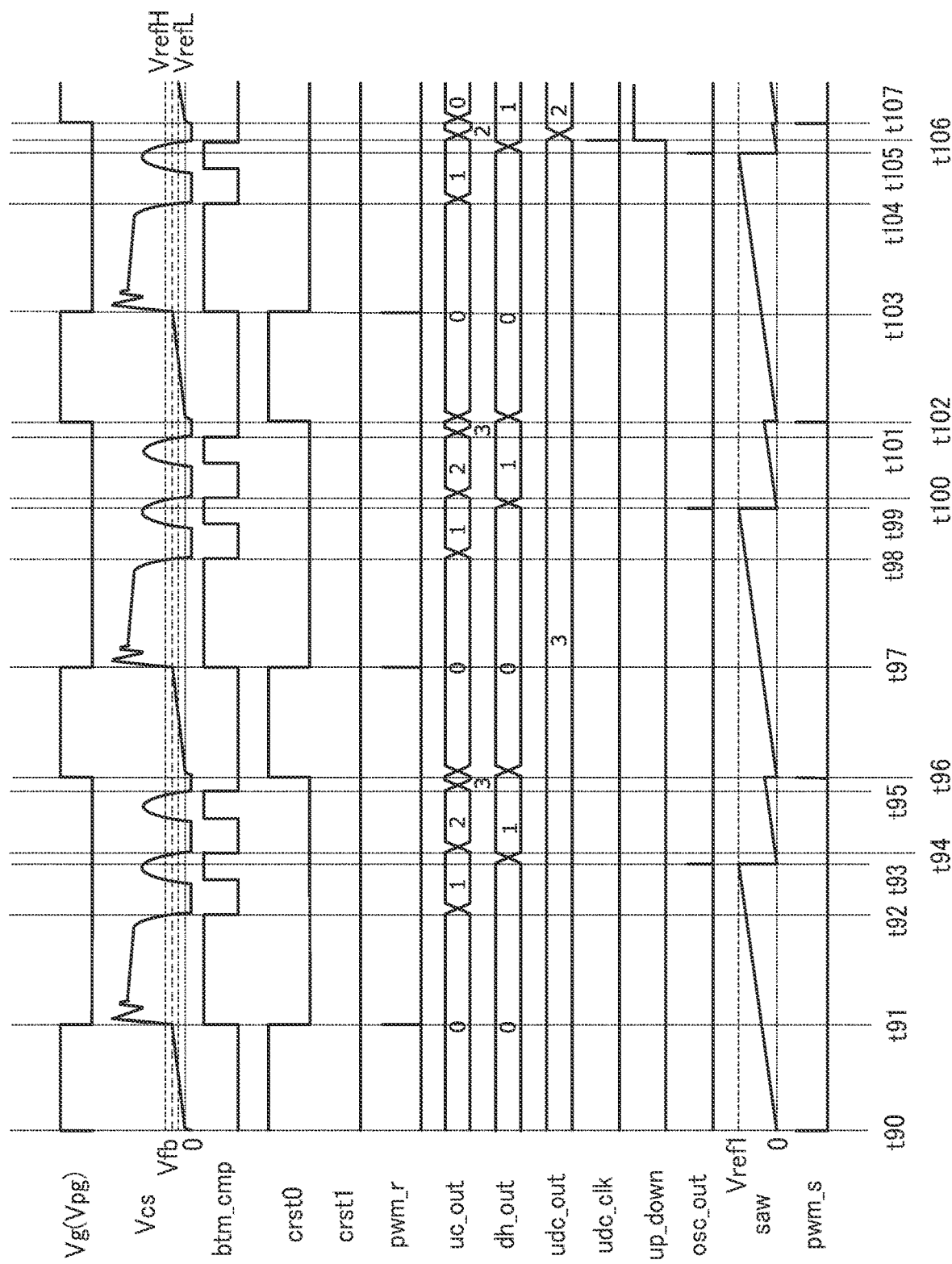
FIG. 18 is a diagram of an example of a timing chart illustrating an operation of a control IC 32 when an oscillation frequency Fsw increases in a "discontinuous operation".

FIG. 18 is a diagram of an example of a timing chart illustrating an operation of the control IC 32 when the load 11 becomes heavy and the oscillation frequency Fsw increases in the "discontinuous operation". Note that FIG. 18 corresponds to the condition A4 in FIG. 3. Further, time t90, t96, t102, t107 in FIG. 18 corresponds to time t60, t63 in FIG. 16. Time t91, t97, t103 in FIG. 18 corresponds to time t61 in FIG. 16. Time t92, t98, t104 in FIG. 18 corresponds to time t62 in FIG. 16.

The changes in the signals btm_cmp, crst0, crst1, pwm_r, saw, and osc_out are as has been described above and thus will not be described in detail. It is also assumed that the up-down counter 91 outputs a count value "3" as the signal udc_out (reference frequency) before time t90. Since the signal udc_out is larger than a value obtained by adding 1 to the signal dh_out, the comparator 116 outputs a low signal up_down before time t90.

Since the operation of the control IC 32 from time t90 to time t91 is the same as the operation of the control IC 32 from time t70 to time t71 in FIG. 17, a description thereof is omitted.

At time t92, at which the voltage Vcs drops below the threshold voltage VrefL, the hysteresis comparator 41 outputs a low signal btm_cmp. Then, the up counter 90 counts up in response to the low signal btm_cmp and changes the signal uc_out from "0" to "1".

In this event, since the signal udc_out is larger than the value obtained by adding 1 to the signal dh_out, the comparator 116 outputs a low signal up_down. Further, a state in which the signal up_down is low upon receipt of the signal osc_out, does not continue for a predetermined number of times (herein, three times). Thus, the clock generation circuit 117 does not output a pulse signal udc_clk. As a result, the up-down counter 91 causes the signal udc_out to remain "3" without counting down. Thereafter, the voltage Vcs starts to oscillate.

At time t93, at which the oscillator circuit 43 outputs a pulse signal osc_out, the data hold 92 takes in a signal uc_out and outputs the signal as a signal dh_out. In this event, the signal udc_out is larger than the value obtained by adding 1 to the signal dh_out, and thus the comparator 116 outputs a low signal up_down.

Further, the state in which the signal up_down is low upon receipt of the signal osc_out, does not continue for the predetermined number of times. Thus, the clock generation circuit 117 does not output a pulse signal udc_clk. As a result, the up-down counter 91 causes the signal udc_out to remain "3" without counting down.

At time t94, at which the voltage Vcs oscillates and drops below the threshold voltage VrefL, the hysteresis comparator 41 operates in the same manner as at time t92, and the up counter 90 changes the signal uc_out from "1" to "2". Then, because a signal udc_clk is not received, the up-down counter 91 causes the signal udc_out to remain "3".

At time t95, at which the voltage Vcs oscillates and drops below the threshold voltage VrefL, the hysteresis comparator 41 operates in the same manner as at time t92, and the up counter 90 sets the signal uc_out to "3". Since a signal udc_clk is not received, the up-down counter 91 causes the signal udc_out to remain "3".

In this event, the pulse signal osc_out has already been received, and the signal uc_out and the signal udc_out match, and thus the bottom controller 93 outputs a pulse signal pwm_s, at time t96 at which the waiting period has elapsed since time t95. And, the power transistor 30 is turned on.

Note that the "waiting period" is a time period from time t95, at which the voltage Vcs reaches the threshold value VrefL, to the next bottom (not illustrated) of the oscillation (ringing). That is, the "waiting period" is a time period of substantially ¼ of the ringing period. As a result, the bottom controller 93 can turn on the power transistor 30 at a timing at which the drain-source voltage of the power transistor 30 is small.

Because the pulse signal pwm_s is received, the oscillator circuit 43 then outputs a pulse signal osc_out at a timing at which the oscillation period corresponding to the frequency Fsw has elapsed since the pulse signal pwm_s is received. From time t96 to time t102, the operation from time t90 to time t96 is repeated.

From time t102 to time t105, the operation from time t90 to time t93 is repeated.

However, at time t105, a state in which the signal udc_out is larger than the value obtained by adding 1 to the signal dh_out upon receipt of the signal osc_out continues for a predetermined number of times (e.g., three times in the case of FIG. 18). That is, a state in which the comparator 116 outputs a low signal up_down after the pulse signal osc_out is received, continues for a predetermined number of times.

Thus, the clock generation circuit 117 outputs a pulse signal udc_clk at time t106. In this event, the up-down counter 91 counts down the count value from "3" to "2", and outputs a resultant value as a signal udc_out. Because the signal udc_out becomes equal to the value obtained by adding 1 to the signal dh_out, the comparator 116 outputs a high signal up_down.

As has been described above, the control IC 32 reduces the reference frequency in response to the load 11 approaching a heavy load state and the oscillation frequency Fsw increasing. In this case, the control IC 32 counts down the reference frequency, that is, the signal udc_out, in response to the condition under which the reference frequency is reduced being satisfied for a predetermined number of times. This enables the control IC 32 to restrain a sudden increase in the switching frequency Ftr to thereby reduce noise generation in the transformer 22.

Then, at time t106, the voltage Vcs drops below the threshold voltage VrefL. Thus, the up counter 90 outputs a signal uc_out of "2".

At time t107 at which the waiting period has elapsed since time t106, the pulse signal osc_out has already been received and the signal uc_out and the signal udc_out match. Thus, the bottom controller 93 outputs a pulse signal pwm_s. And, the power transistor 30 is turned on. Because the pulse signal pwm_s is received, the oscillator circuit 43 then outputs a pulse signal osc_out at a timing at which the oscillation period corresponding to the frequency Fsw has elapsed since the pulse signal pwm_s is received.

<<<When Oscillation of Voltage Vcs Becomes Small>>>

When the control IC 32 performs the "discontinuous operation", the oscillation of the voltage Vcs may become weak due to some factor, which may make it impossible for the hysteresis comparator 41 to detect the oscillation of the voltage Vcs. In this case, the output circuit 111 is unable to output the pulse signal out0. Thus, the power transistor 30 is not turned on. In such a case, the use of the generation circuit 114 illustrated in FIG. 19 makes it possible to turn on the power transistor 30 even when the oscillation of the voltage Vcs is small.

To be more specific, the generation circuit 114 generates a pulse signal out1 in response to a predetermined time period having elapsed when an oscillation of the voltage Vcs cannot be detected at all, and generates a pulse signal out1 according to the oscillation period of the voltage Vcs when the oscillation of the voltage Vcs can be detected at least once. On the other hand, the generation circuit 114 does not generate the pulse signal out1 when the oscillation of the voltage Vcs continue to be detected. The generation circuit 114 operates in response to the D flip-flop 113 outputting a high signal en thereto. Note that the predetermined time period corresponds to a "first time period".

<<<Details of Generation Circuit 114>>>

The generation circuit 114 includes a trigger circuit 120, timers 121 and 122, an OR element 123, and an output circuit 124. The trigger circuit 120 outputs a signal that triggers the timers 121 and 122. To be more specific, the trigger circuit 120 outputs signals Vg1 and Vg2 that trigger the timer 121 to output a signal outa which will be the base of the pulse signal out1, when the oscillation of the voltage Vcs cannot be detected at all. The trigger circuit 120 outputs signals Vg3 and Vg4 that trigger the timer 122 to output a signal outb which will be the base of the pulse signal out1, when the oscillation of the voltage Vcs can be detected at least once.

<<Trigger Circuit 120>>

The trigger circuit 120 includes D flip-flops 130, 133, and 135, one-shot circuits 131 and 132, AND elements 134 and 136, and a selector 137. The circuit configuration of the trigger circuit 120 will be described first with reference to FIG. 19. Thereafter, the timers 121 and 122, the OR element 123, and the output circuit 124 will be described, and then how the generation circuit 114 operates in response to the signals Vg1 to Vg4 will be described.

The D flip-flop 130 operates to generate the signals Vg1 to Vg4 according to the oscillation of the voltage Vcs. To be more specific, the D flip-flop 130 is reset in response to the signal en being low. Further, in response to the signal en going high and the signal btm_cmp going low due to the oscillation of the voltage Vcs, the D flip-flop 130 outputs a high signal Vg1 from a Q output.

Thereafter, every time the voltage Vcs oscillates and the signal btm_cmp goes low, the D flip-flop 130 inverts the Q output. The Q output of the D flip-flop 130 is the signal Vg1. This causes the timer 121, which will be described later, not to output the pulse signal outa while the oscillation of the voltage Vcs can be detected.

The one-shot circuit 131 outputs a pulse signal Vg1_osh at the rising edge of the Q output of the D flip-flop 130. A Q bar output of the D flip-flop is a signal Vg1_b. Then, the one-shot circuit 132 outputs a pulse signal Vg2 at the rising edge of the signal Vg1_b.

The D flip-flop 133 is reset in response to the signal en being low. Further, in response to release of the reset and reception of a high signal btm_cmp, the D flip-flop 133 outputs the signal en as a signal en1.

The AND element 134 calculates a logical product of the signal en1 and the pulse signal Vg1_b. The AND element 134 outputs a signal Vg3. The signal Vg3 has a logic level opposite to the logic level of the signal Vg1 while the signal en1 is high. Thus, as in the case of the timer 121, the timer 122, which will be described later, does not output the pulse signal outb while the oscillation of the voltage Vcs can be detected.

The D flip-flop 135 is reset in response to the signal en being low. Further, in response to release of the reset and receipt of a high signal btm_cmp, the D flip-flop 135 outputs the signal en1 as a signal en2.

The AND element 136 calculates a logical product of the signal Vg1_b and a signal obtained by inverting the signal Vg3, and outputs a resultant to the selector 137. In response to the signal en2 being low, the selector 137 outputs the output of the AND element 136 as a signal Vg4. On the other hand, in response to the signal en2 being high, the selector 137 outputs the signal Vg1_osh as a signal Vg4.

<<Details of Timers 121 and 122>>

The timer 121 starts measuring time in response to the voltage Vcs reaching the threshold voltage VrefL, and then outputs a pulse signal outa which will be the base of the pulse signal out1 when an oscillation of the voltage Vcs cannot be detected at all. When the oscillation of the voltage Vcs can be detected at least once, the timer 122 measures a time period corresponding to the oscillation period of the voltage Vcs, to output a pulse signal outb which will be the base of the pulse signal out1. First, the circuits of the timers 121 and 122 will be described with reference to FIG. 20. Subsequently, the operation of the generation circuit 114 including the timers 121 and 122 will be described with reference to FIGS. 21 and 22. Note that the trigger circuit 120 corresponds to a "measurement circuit", the timer 121 corresponds to a "first timer", and the timer 122 corresponds to a "second timer".

Figure 20:
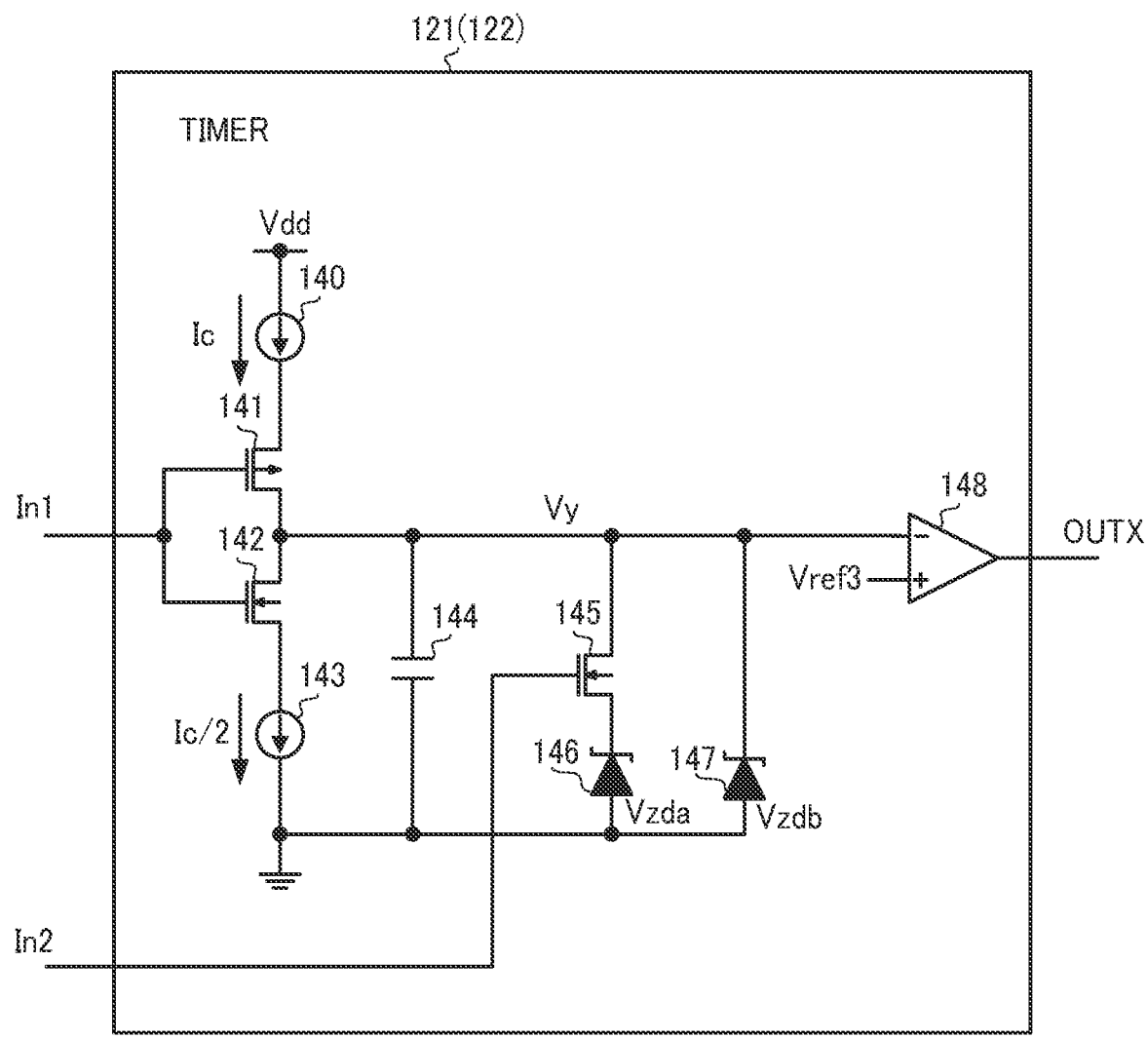
FIG. 20 is a diagram illustrating a configuration example of timers 121 and 122.

FIG. 20 is a diagram illustrating a configuration example of the timers 121 and 122. The timers 121 and 122 output a signal OUTX in response to signals In1 and In2. Since the timers 121 and 122 have the same configuration, the following describes the timer 121 as an example.

The timer 121 includes constant current sources 140 and 143, a PMOS transistor 141, NMOS transistors 142 and 145, a capacitor 144, Zener diodes 146 and 147, and a comparator 148.

In response to a low signal In1 being inputted, the constant current source 140 charges the capacitor 144 with a current Ic through the PMOS transistor 141. On the other hand, in response to a high signal In1 being inputted, the constant current source 140 does not charge the capacitor 144 with the current Ic because the PMOS transistor 141 is turned off. Note that a voltage generated in the capacitor 144 is referred to as voltage Vy.

In response to the high signal In1 being inputted, the constant current source 143 discharges the capacitor 144 with a current Ic/2 through the NMOS transistor 142. On the other hand, in response to a low signal In1 being inputted, the constant current source 143 does not discharge the capacitor 144 with the current Ic/2 because the NMOS transistor 142 is turned off. Note that a "capacitance value of the capacitor 144" is determined such that the voltage Vy drops below a reference voltage Vref3 in response to a predetermined time period having elapsed since the high signal In1 being inputted.

The NMOS transistor 145 is turned on upon receiving a high signal In2, and clamps the voltage Vy generated in the capacitor 144 to a voltage Vzda. The voltage Vzda is a voltage clamped by the Zener diode 146. On the other hand, the NMOS transistor 145 is turned off upon receiving a low signal In2, and does not clamp the voltage Vy to the voltage Vzda. The Zener diode 147 also clamps the voltage Vy to a voltage Vzdb.

The comparator 148 compares the voltage Vy with the reference voltage Vref3, to output a signal OUTX. To be more specific, the comparator 148 outputs a high signal OUTX, in response to the signal In1 being high, the capacitor 144 being discharged, and the voltage Vy dropping below the reference voltage Vref3.

On the other hand, in response to the signal In1 being low, the capacitor 144 being charged, and the voltage Vy rising above the voltage Vref3, the comparator 148 outputs a low signal OUTX. Here, the voltage Vzdb>the voltage Vzda>the reference voltage Vref3.

Accordingly, the timers 121 and 122 discharge the capacitor 144 with the current Ic/2 while the signal In1 is high, and charge the capacitor 144 with the current Ic while the signal In1 is low. In this event, in response to the voltage Vy exceeding the voltage Vzdb, the voltage Vy is clamped to the voltage Vzdb by the Zener diode 147. The timers 121 and 122 clamp the voltage Vy to the voltage Vzda when or while the signal In2 is high. Meanwhile, the timers 121 and 122 clamp the voltage Vy to the voltage Vzdb in response to the voltage Vy exceeding the voltage Vzdb while the signal In2 is low.

Referring back to FIG. 19, the generation circuit 114 will be described again. The OR element 123 calculates a logical sum of the pulse signal outa from the timer 121 and the pulse signal outb from the timer 122, to output a resultant as a pulse signal outc.

The output circuit 124 outputs a pulse signal out1, upon receiving a pulse signal osc_out after receipt of a low signal crst0 from the control circuit 40 and the pulse signal outc.

On the other hand, the output circuit 124 outputs the pulse signal out1, when the pulse signal osc_out has already been received upon receipt of a low signal crst0 from the control circuit 40 and the pulse signal outc.

Note that the output circuit 124 is reset and outputs a low pulse signal out1 every time the control circuit 40 outputs the high signal crst0 thereto.

Thus, in response to the trigger circuit 120 continuing to output a high signal Vg1 for a predetermined time period, the timer 121 outputs the pulse signal outa. However, when the oscillation of the voltage Vcs can be detected, the D flip-flop 130 inverts the logic level of the signal Vg1 every time the signal btm_cmp goes low. Thus, the timer 121 does not output the pulse signal outa while the oscillation of the voltage Vcs can be detected with a period shorter than the predetermined time period. Note that the predetermined time period corresponds to a "first time period".

Further, when the trigger circuit 120 continues to output the high signal Vg3 for the predetermined time period, the timer 122 outputs the pulse signal outb as in the case of the timer 121. Then, the trigger circuit 120 outputs a signal Vg4 such that the timer 122 can output the pulse signal outb according to the oscillation period when the oscillation of the voltage Vcs can be detected at least once. When or while a high signal Vg4 is inputted to the timer 122, the voltage Vy of the timer 122 is clamped to the voltage Vzda. The operation of the timer 122 will be described later in detail.

<<<Operation of Generation Circuit 114 when Oscillation of Voltage Vcs is Continuously Detected>>>

Figure 21:
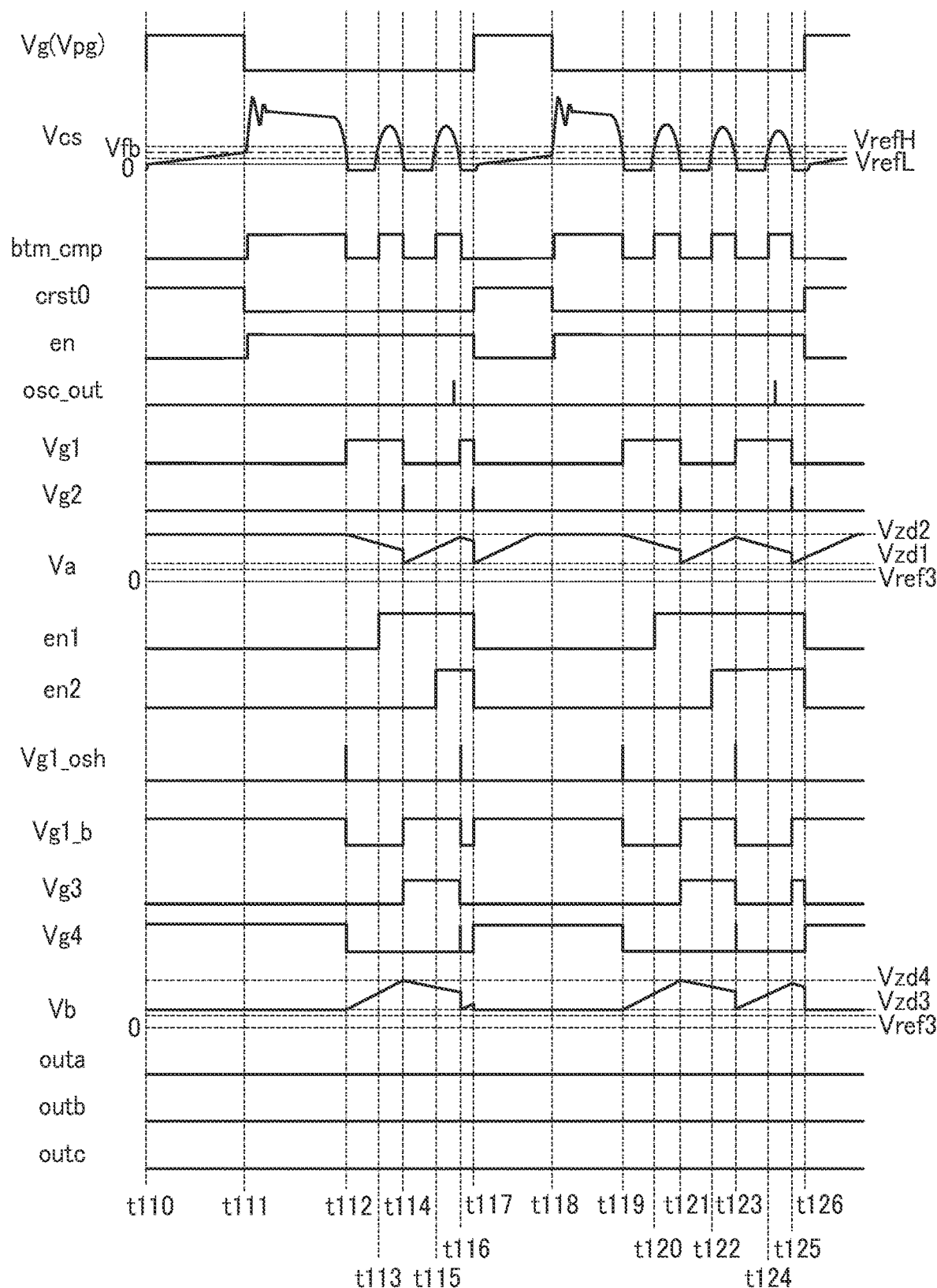
FIG. 21 is a diagram of an example of a timing chart illustrating an operation of a generation circuit 114 when a bottom can be detected during a "discontinuous operation".

FIG. 21 is a diagram of an example of a timing chart illustrating an operation of the generation circuit 114 when a bottom is present in the "discontinuous operation". In this case, the generation circuit 114 outputs no pulse signal out1. However, in this case, the output circuit 111 of FIG. 14 outputs a signal out0. Note that, in FIG. 21, voltages Vzd1, Vzd3 corresponds to the voltage Vzda, and voltages Vzd2, Vzd4 corresponds to the voltage Vzdb. The voltage Va corresponds to the voltage Vy in the timer 121, and the voltage Vb corresponds to the voltage Vy in the timer 122.

At time t110, in response to the control IC 32 outputting a high drive signal Vg, the power transistor 30 is turned on. In response to turning on of the power transistor 30, the voltage Vcs rises. While the power transistor 30 is on, the control circuit 40 outputs a high signal crst0.

Figure 19:
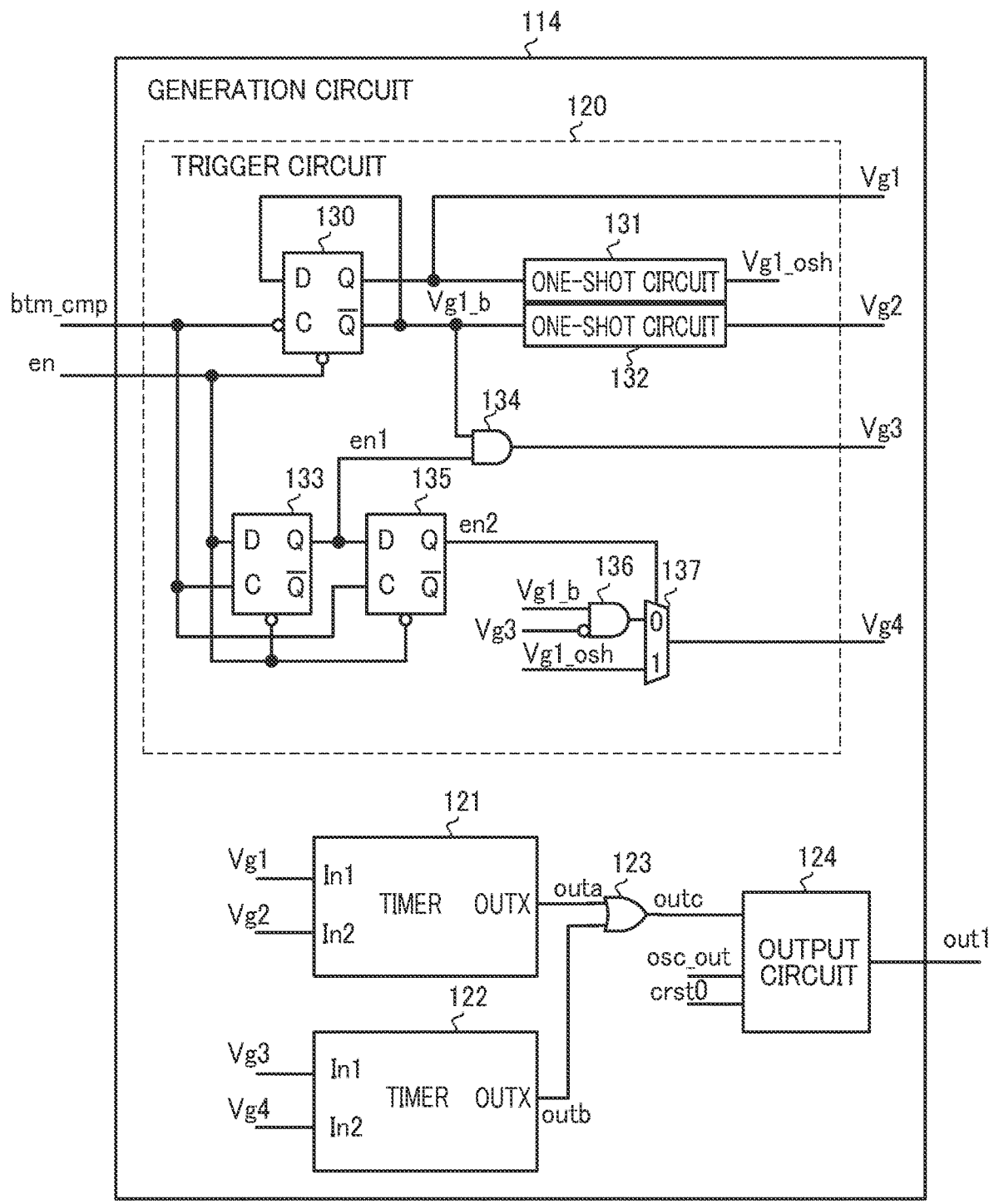
FIG. 19 is a diagram illustrating a configuration example of a generation circuit 114.

While a low signal en is received, the D flip-flop 130 in FIG. 19 outputs a low signal Vg1 and a high signal Vg1_*b*, and the one-shot circuit 132 outputs a low signal Vg2. Thus, the voltage Va is clamped to the voltage Vzd2.

Further, the AND element 134 outputs a low signal Vg3. In this event, the selector 137 outputs a high signal Vg4. Thus, the voltage Vb is clamped to the voltage Vzd3.

In response to the voltage Vcs reaching the voltage Vfb at time t111, the control IC 32 outputs a low drive signal Vg, to thereby turn off the power transistor 30. In response to turning off of the power transistor 30, the voltage Vcs exceeds the threshold voltage VrefH and the hysteresis comparator 41 outputs a high signal btm_cmp. Further, in response to turning off of the power transistor 30, the control circuit 40 outputs a low signal crst0.

In response to the control circuit 40 outputting the low signal crst0, the signal btm_cmp goes high, and thus the D flip-flop 113 outputs a high signal en. Then, the D flip-flop 130 outputs a low signal Vg1 and a high signal Vg1_*b*.

At time t112, in response to the voltage Vcs dropping below the threshold voltage VrefL, the hysteresis comparator 41 outputs a low signal btm_cmp. In this event, the D flip-flop 130 outputs a high signal Vg1 and a low signal Vg1_*b*. Further, the one-shot circuit 131 outputs a pulse signal Vg1_*osh*.

The D flip-flop 133 outputs a low signal en1, and thus the AND element 134 outputs a low signal Vg3. Further, the D flip-flop 135 outputs a low signal en2, and thus the selector 137 outputs a low signal Vg4.

In this event, because the signal Vg1 goes high, the voltage Va drops. Likewise, because the signal Vg4 goes low, the voltage Vb rises.

At time t113, in response to the voltage Vcs oscillating and exceeding the threshold voltage VrefH, the hysteresis comparator 41 outputs a high signal btm_cmp. Upon receiving the high signal btm_cmp, the D flip-flop 133 outputs a high signal en as a signal en1. In this event, the D flip-flop 130 outputs the low Vg1_*b*, and thus the AND element 134 continues to output the low signal Vg3.

At time t114, in response to the voltage Vcs dropping below the threshold voltage VrefL, the hysteresis comparator 41 outputs a low signal btm_cmp. In this event, the D flip-flop 130 outputs a low signal Vg1 and a high signal Vg1_*b*. Further, the one-shot circuit 132 outputs a pulse signal Vg2. The timer 121 changes the voltage Va to the voltage Vzd1 upon receiving the pulse signal Vg2.

The signal en1 and the signal Vg1_*b* are high, and thus the AND element 134 outputs a high signal Vg3. This causes the timer 122 to lower the rising voltage Vb.

In response to the voltage Vcs oscillating and exceeding the threshold voltage VrefH at time t115, the hysteresis comparator 41 outputs a high signal btm_cmp. Upon receiving the high signal btm_cmp, the D flip-flop 135 outputs a high signal en1 as a signal en2.

At time t116, in response to the voltage Vcs dropping below the threshold voltage VrefL, the hysteresis comparator 41 outputs a low signal btm_cmp. In this event, the D flip-flop 130 outputs a high signal Vg1 and a low signal Vg1_*b*. Further, the timer 121 lowers the voltage Va upon receiving the high signal Vg1. Because the signal Vg1 goes high, the one-shot circuit 131 outputs a pulse signal Vg1_*osh*.

Because the signal Vg1_*b* goes low, the AND element 134 outputs a low signal Vg3. Because the signal en2 is high, the selector 137 outputs the pulse signal Vg1_*osh* as a signal Vg4.

The operation of the generation circuit 114 from time t117 to t123 is the same as the operation of the generation circuit 114 from time t110 to t116, and thus a description thereof is omitted.

At time t124, in response to the voltage Vcs oscillating and exceeding the threshold voltage VrefH, the hysteresis comparator 41 outputs a high signal btm_cmp.

At time t125, in response to the voltage Vcs dropping below the threshold voltage VrefL, the hysteresis comparator 41 outputs a low signal btm_cmp. In this event, the D flip-flop 130 outputs a low signal Vg1 and a high signal Vg1_*b*. The one-shot circuit 132 outputs a pulse signal Vg2 because the signal Vg1_*b* goes high. The timer 121 changes the voltage Va to the voltage Vzd1 upon receiving the pulse signal Vg2.

Because the signal en1 is high, the AND element 134 outputs the high signal Vg1_*b* as a signal Vg3. Thus, the timer 122 lowers the voltage Vb.

At time t126, in response to the control IC 32 outputting a high drive signal Vg, the power transistor 30 is turned on. In response to turning on of the power transistor 30, the control circuit 40 outputs a high signal crst0, and thus the generation circuit 114 is reset.

Accordingly, neither of the voltages Va and Vb drops below the reference voltage Vref3 from time t110 to time t126, and thus the pulse signals outa, outb, and outc are not outputted. Thus, the generation circuit 114 does not output the pulse signal out1 when the oscillation of the voltage Vcs is detected. Accordingly, when the oscillation of the voltage Vcs is detected, the output circuit 111 of FIG. 14 turns on the power transistor 30 at an appropriate timing.

<<<Operation of the Generation Circuit 114, when the Oscillation of the Voltage Vcs Cannot be Detected or Becomes Unable to be Detected in the Middle of the Oscillation>>>

Figure 22:
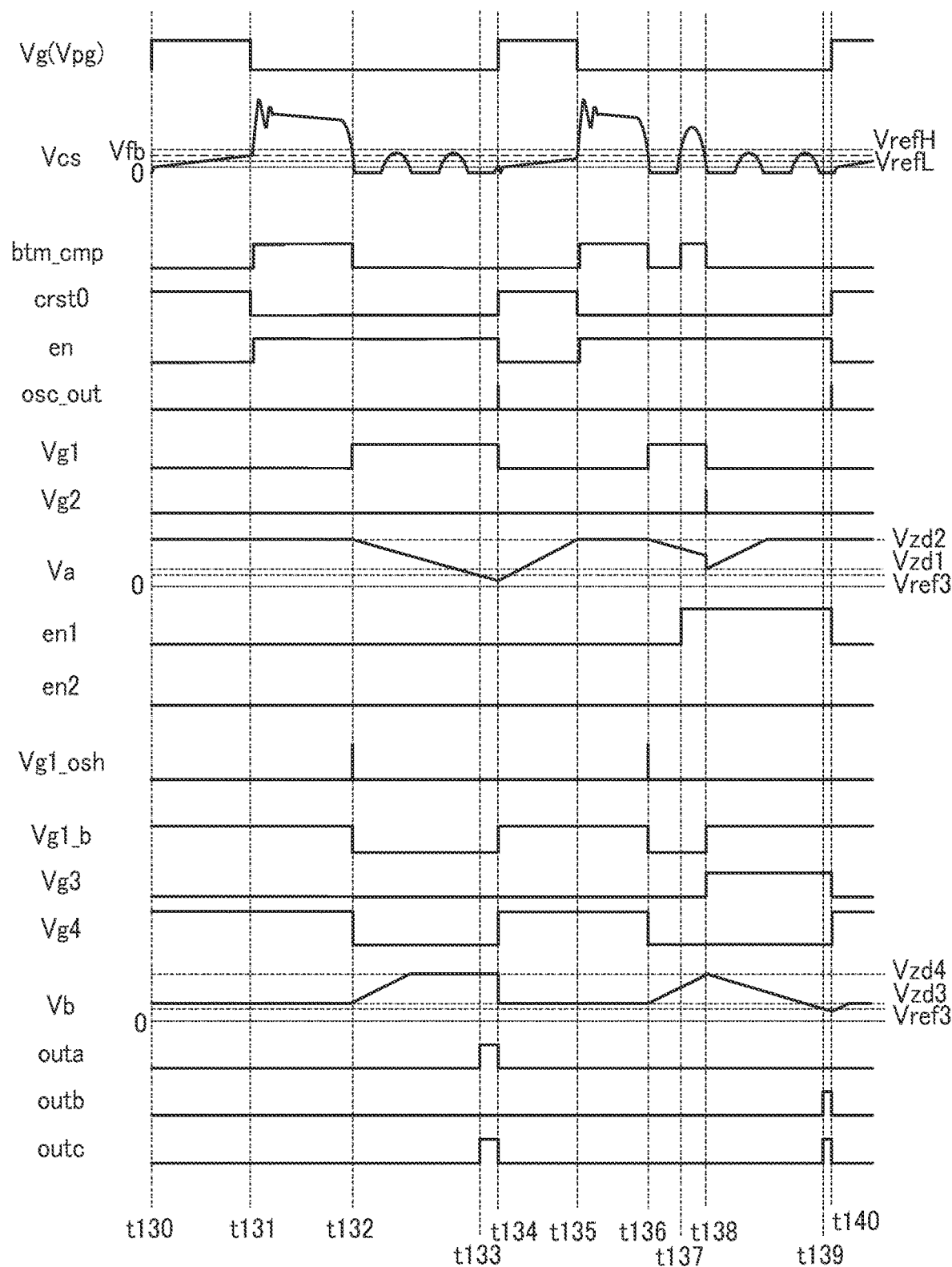
FIG. 22 is a diagram of an example of a timing chart illustrating an operation of a generation circuit 114 when a bottom cannot be detected during a "discontinuous operation".

FIG. 22 is a diagram of an example of a timing chart illustrating an operation of the generation circuit 114 when the bottom disappears in the "discontinuous operation". In this case, the generation circuit 114 outputs a pulse signal out1. Note that, in FIG. 22, voltages Vzd1, Vzd3 corresponds to the voltage Vzda, and voltages Vzd2, Vzd4 corresponds to the voltage Vzdb. The voltage Va corresponds to the voltage Vy in the timer 121, and the voltage Vb corresponds to the voltage Vy in the timer 122.

[Operation of the Generation Circuit 114 when the Oscillation of the Voltage Vcs Cannot be Detected]

First, in order to explain operations of the trigger circuit 120 and the timer 121, the operation of the generation circuit 114 from time t130 to t134 will be described.

The operation of the generation circuit 114 from time t130 to t132 is the same as the operation of the generation circuit 114 from time t110 to t112 in FIG. 21, a description thereof is omitted.

At time t133, a predetermined time period has elapsed since the D flip-flop 130 outputs a high signal Vg1 at time t132. Further, the oscillation of the voltage Vcs has not been detected so far, and thus the voltage Va drops below the reference voltage Vref3 and the timer 121 outputs a high pulse signal outa.

At time t134, in response to the oscillator circuit 43 outputting a pulse signal osc_out, the generation circuit 114 outputs a pulse signal out1 because the pulse signal outa has already been outputted, and the power transistor 30 is turned on. In response to turning on of the power transistor 30, the control circuit 40 outputs a high signal crst0, and thus the generation circuit 114 is reset.

[Operation of the Generation Circuit 114, when the Oscillation of the Voltage Vcs Becomes Unable to be Detected in the Middle of the Oscillation]

Next, in order to explain the operation of the trigger circuit 120 and the timer 122, the operation of the generation circuit 114 between time t134 and t140 will be described.

The operation of the generation circuit 114 from time t134 to t136 is the same as the operation of the generation circuit 114 from time t110 to t112 in FIG. 21, and thus a description thereof is omitted.

At time t137, in response to the voltage Vcs oscillating and exceeding the threshold voltage VrefH, the hysteresis comparator 41 outputs a high signal btm_cmp. In this event, the D flip-flop 133 outputs a high signal en as a signal en1.

At time t138, in response to the voltage Vcs dropping below the threshold voltage VrefL, the hysteresis comparator 41 outputs a low signal btm_cmp. In this event, the D flip-flop 130 outputs a low signal Vg1 and a high signal Vg1_*b*. The one-shot circuit 132 outputs a pulse signal Vg2 because the signal Vg1_*b* goes high. The timer 121 changes the voltage Va to the voltage Vzd1 upon receiving the pulse signal Vg2.

Because the signal en1 is high, the AND element 134 outputs the high signal Vg1_*b* as a signal Vg3. The timer 122 lowers the voltage Vb upon receiving the high signal Vg3.

At time t139, a predetermined time period has elapsed since the AND element 134 outputs the high signal Vg3. In this event, the voltage Vb drops below the reference voltage Vref3. Thus, the timer 122 outputs a high signal outb.

At time t140, in response to the oscillator circuit 43 outputting a pulse signal osc_out, the generation circuit 114 outputs a pulse signal out1 because the pulse signal outb has already been outputted, and the power transistor 30 is turned on. In response to turning on of the power transistor 30, the control circuit 40 outputs a high signal crst0, and thus the generation circuit 114 is reset.

Accordingly, the timer 122 charges the capacitor 144 with a current Ic, and discharges the capacitor 144 with a current Ic/2. Thus, the time period from time t138 to time t139 is about twice the time period from time t136 to time t138. This enables the timer 122 to output the pulse signal outb according to the oscillation period of the voltage Vcs. Note that the time period from time t138 to time t139 corresponds to a "second time period".

=== Modified Example ===

The hysteresis comparator 41 has a hysteresis characteristic that changes the output with the threshold voltages VrefH and VrefL. However, the comparator to detect the voltage Vcs does not necessarily have to have a hysteresis characteristic.

Further, although the hysteresis comparator 41 is configured to detect the voltage Vcs, the hysteresis comparator may be configured to detect the voltage Vcc at the terminal VCC instead of the voltage Vcs. The hysteresis comparator 41 may also detect a voltage (e.g., a voltage corresponding to the inductor current IL1) that changes according to the voltage Vx of the electrode on the high potential side of the power transistor 30.

Further, although the up counter 90 is used to detect whether the AC-DC converter 12 performs a discontinuous operation, the circuit that holds the bottom frequency in response to the oscillation of the voltage Vcs is not limited to the up counter. For example, the circuit that holds the bottom frequency may be, for example, an up-down counter, a down counter, or the like.

===Summary===

(1) The AC-DC converters 10 and 12 according to an embodiment of the present disclosure have been described above. The control IC 32 includes the control circuit 40, the second determination circuit including the hysteresis comparator 41, the up counter 90, and the determination circuit 110, the oscillator circuit 43, and the switching control circuit 44. By virtue of the control circuit 40 and the second determination circuit, the control IC 32 can switch the power transistor 30 according to the state of the load 11. This makes it possible to provide an integrated circuit that appropriately controls the AC-DC converter according to the state of the load.

(2) The switching control circuit 44 includes: the signal generation circuit 100; and the off signal output circuit including the comparator 53, the overcurrent protection circuit 54, the timer 55, the AND element 56, and the OR element 57. This enables the control IC 32 to switch the power transistor 30 according to the state of the load 11 and the operating state of the AC-DC converter 12.

(3) The oscillator circuit 43 outputs a pulse signal osc_out whose frequency increases with an increase in the load current Iout. This enables the AC-DC converters 10 and 12 to supply power to the load 11 according to the state of the load 11.

(4) The control circuit 40 detects the state of the load 11 based on the voltage Vfb corresponding to the output voltage Vout, and the oscillator circuit 43 changes the frequency of the pulse signal osc_out based on the voltage Vfb. This enables the control IC 32 to control the AC-DC converter 10 or the AC-DC converter 12 according to the state of the load 11.

(5) In response to the pulse signal pwm_s being received before the oscillation period has elapsed since the pulse signal osc_out has been outputted, the oscillator circuit 43 measures the oscillation period again and then outputs the pulse signal osc_out. This makes it possible that the switching frequency Ftr of the power transistor 30 becomes substantially the same as the oscillation frequency Fsw.

(6) The oscillator circuit 43 is realized by the circuit illustrated in FIG. 4. This makes it possible to output the pulse signal osc_out having the oscillation frequency Fsw corresponding to the voltage Vfb, that is, the state of the load 11.

(7) The second determination circuit includes the hysteresis comparator 41, the up counter 90, and the determination circuit 110. This enables the control IC 32 to determine whether the AC-DC converter 12 performs a discontinuous operation or a continuous operation with a simple circuit.

(8) The signal generation circuit 100 includes the timer 121. This enables the control IC 32 to turn on the power transistor 30 after a lapse of a predetermined time period even if an oscillation of the voltage Vcs cannot be detected.

(9) The signal generation circuit 100 includes the trigger circuit 120 and the timer 122. This enables the control IC 32 to turn on the power transistor 30 at a timing based on the cycle of the bottom, when the power transistor 30 is off and the bottom can be detected at least once.

(10) The control IC 32 includes: the hysteresis comparator 41; the oscillator circuit 43; the off signal output circuit including the comparator 53, the overcurrent protection circuit 54, the timer 55, the AND element 56, and the OR element 57; the up-down counter 91; and the adjustment circuit 101. This enables the control IC 32 to create a difference between the first and second conditions such that the switching frequency Ftr does not suddenly increase. This can suppress noise generation in the transformer 22.

(11) The control IC 32 includes the up counter 90 and the data hold 92. This enables the control IC 32 to determine whether to reduce or increase the switching frequency Ftr based on the timing at which the pulse signal osc_out is received.

(12) The signal generation circuit 100 includes the determination circuit 110, and the adjustment circuit 101 includes the comparator 115. This enables the control IC 32 to detect the operating state of the AC-DC converter 12 and determine the timing at which the power transistor 30 is to be turned on.

(13) The adjustment circuit 101 includes the comparator 116 and the clock generation circuit 117. This enables the control IC 32 to appropriately control the up-down counter 91 that holds the reference count, to change the switching frequency Ftr according to the state of the load 11.

(14) The signal generation circuit 100 outputs the pulse signal pwm_s in response to the comparison results of the comparators 115 and 116 and the pulse signal osc_out. This enables the control IC 32 to prevent a sudden change in the switching frequency Ftr even if the oscillation frequency Fsw changes rapidly. This suppresses noise generation in the transformer 22.

(15) In response to the pulse signal pwm_s being received before the oscillation period has elapsed since the pulse signal osc_out has been outputted, the oscillator circuit 43 measures the oscillation period again and outputs the pulse signal osc_out. This makes it possible that the switching frequency Ftr of the power transistor 30 becomes substantially the same as the oscillation frequency Fsw.

(16) The oscillator circuit 43 is realized by the circuit illustrated in FIG. 4. This makes it possible to output the pulse signal osc_out having the oscillation frequency Fsw corresponding to the voltage Vfb, that is, the state of the load 11.

(17) The signal generation circuit 100 includes the timer 121. This enables the control IC 32 to turn on the power transistor 30 after a lapse of a predetermined time period even if an oscillation of the voltage Vcs cannot be detected.

(18) The signal generation circuit 100 includes the trigger circuit 120 and the timer 122. This enables the control IC 32 to turn on the power transistor 30 at a timing based on the cycle of the bottom, when the power transistor 30 is off and the bottom can be detected at least once.

The present disclosure is directed to provision of an integrated circuit configured to appropriately control a transistor of a power supply circuit according to a state of a load.

According to the present disclosure, it is possible to provide an integrated circuit configured to appropriately control a transistor of a power supply circuit according to the state of a load.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. An integrated circuit for a power supply circuit that generates for a load an output voltage of a predetermined level from an input voltage thereof, the power supply circuit including
a transformer including a primary coil, a secondary coil, and an auxiliary coil, and
a transistor configured to control a current flowing through the primary coil,
the integrated circuit being configured to drive the transistor, the integrated circuit comprising:
a first determination circuit configured to determine whether the load is in a first state or a second state, wherein the load is a heavy load in the first state and a light load in the second state;
a second determination circuit configured to determine whether a current of the secondary coil is in a continuous mode in which the current of the secondary coil does not reach zero when the transistor is off, or in a discontinuous mode in which the current of the secondary coil reaches zero when the transistor is off; an oscillator circuit configured to output an oscillator signal; and
a switching control circuit configured to control switching of the transistor in response to a determination result of the second determination circuit and the oscillator signal, when the load is in the second state, and in response to the oscillator signal irrespective of the determination result of the second determination circuit, when the load is in the first state.

2. The integrated circuit according to claim 1, wherein the switching control circuit includes
an on signal output circuit configured to
output an on signal to turn on the transistor in response to the oscillator signal,
in a first case in which the load is in the second state and the current of the secondary coil is in the continuous mode, or
in a second case in which the load is in the first state, and
output the on signal to turn on the transistor in response to the oscillator signal
and a first voltage corresponding to a voltage on a high potential side of the transistor, in a third case in which the load is in the second state and the current of the secondary coil is in the discontinuous mode; and
an off signal output circuit configured to output an off signal to turn off the transistor, based on a current flowing through the transistor.

3. The integrated circuit according to claim 2, wherein a frequency of the oscillator signal outputted from the oscillator circuit increases with an increase in a load current flowing through the load.

4. The integrated circuit according to claim 3, wherein
the first determination circuit determines, based on a feedback voltage corresponding to the output voltage and a predetermined voltage,
that the load is in the first state when the load current flowing through the load is larger than a predetermined value, and
that the load is in the second state when the load current is smaller than the predetermined value, and
the oscillator circuit changes the frequency of the oscillator signal based on the feedback voltage.

5. The integrated circuit according to claim 2, wherein, in response to the on signal being received within a time period corresponding to a frequency of the oscillator signal after the outputting of the oscillator signal, the oscillator circuit outputs a subsequent oscillator signal at a timing at which the time period has elapsed after the receipt of the on signal.

6. The integrated circuit according to claim 2, wherein the oscillator circuit includes
a first timing circuit configured to start time measurement in response to the oscillator signal or the on signal, and
an oscillator signal output circuit configured to output the oscillator signal, in response to the first timing circuit having measured a time period corresponding to a frequency of the oscillator signal.

7. The integrated circuit according to claim 2, wherein the second determination circuit includes
a comparator circuit configured to compare the first voltage corresponding to the voltage on the high potential side of the transistor when the transistor is off, with a second voltage,
a counter configured to take a count of the first voltage reaching the second voltage, and
a mode determination circuit configured to determine whether the current of the secondary coil is in the continuous mode or the discontinuous mode, based on the count of the counter at a time when the oscillator signal is received, and
the on signal output circuit outputs the on signal, after the oscillator signal is received and the count of the counter reaches a predetermined reference value, in the third case.

8. The integrated circuit according to claim 7, wherein the on signal output circuit includes a first timer configured to output the on signal, upon an elapse of a first time period after the first voltage reaching the second voltage.

9. The integrated circuit according to claim 7, wherein the on signal output circuit includes
a measurement circuit configured to measure a cycle in which the first voltage reaches the second voltage, and
a second timer configured to output the on signal upon an elapse of a second time period after the first voltage reaching the second voltage, the second time period corresponding to the measured cycle.

10. An integrated circuit for a power supply circuit that generates for a load an output voltage of a predetermined level from an input voltage thereof, the power supply circuit including
a transformer including a primary coil, a secondary coil, and an auxiliary coil, and
a transistor configured to control a current flowing through the primary coil, the integrated circuit being configured to drive the transistor, the integrated circuit comprising:
a first comparator circuit configured to compare a first voltage corresponding to a voltage on a high potential side of the transistor, with a second voltage;
an oscillator circuit configured to output an oscillator signal; and
a switching control circuit configured to control switching of the transistor, the switching control circuit including
an on signal output circuit configured to output an on signal to turn on the transistor, after the oscillator signal is received and a first count of the first voltage reaching the second voltage reaches a reference count, in a case where a current of the secondary coil is in a discontinuous mode in which the current of the secondary coil reaches zero when the transistor is off,
an off signal output circuit configured to output an off signal to turn off the transistor, based on a current flowing through the transistor,
a first holding circuit configured to hold the reference count, and
an adjustment circuit configured to
increase the reference count under a first condition, when a load current flowing through the load decreases, and
reduce the reference count under a second condition, when the load current increases.

11. The integrated circuit according to claim 10, further comprising:
a counter configured to take the first count in response to a comparison result of the first comparator circuit; and
a second holding circuit configured to hold the first count at a time when the oscillator signal is received, as a second count, wherein
the first condition is that the first count exceeds the reference count, and
the second condition is that a state in which the second count is smaller than the reference count repeats a predetermined number of times.

12. The integrated circuit according to claim 11, wherein
the on signal output circuit includes a mode determination circuit configured to determine whether the current of the secondary coil is in the discontinuous mode, or in a continuous mode in which the current of the secondary coil does not reach zero when the transistor is off,
the adjustment circuit includes a second comparator circuit configured to compare the first count with the reference count, and
the on signal output circuit outputs the on signal in response to the oscillator signal and a comparison result of the second comparator circuit when the current of the secondary coil is the discontinuous mode.

13. The integrated circuit according to claim 12, wherein the adjustment circuit includes
a third comparator circuit configured to compare the second count with the reference count, and
an updating circuit configured to update the reference count in response to the comparison result of the second comparator circuit and a comparison result of the third comparator circuit.

14. The integrated circuit according to claim 13, wherein the on signal output circuit outputs the on signal, in response to the oscillator signal, the comparison result of the second comparator circuit, and the comparison result of the third comparator circuit, when the current of the secondary coil is in the discontinuous mode.

15. The integrated circuit according to claim 10, wherein, in response to the on signal being received within a time period corresponding to a frequency of the oscillator signal after the outputting of the oscillator signal, the oscillator circuit outputs a subsequent oscillator signal at a timing at which the time period has elapsed after the receipt of the on signal.

16. The integrated circuit according to claim 10, wherein the oscillator circuit includes
   a first timing circuit configured to start time measurement in response to the oscillator signal or the on signal, and
   an oscillator signal output circuit configured to output the oscillator signal, in response to the first timing circuit having measured a time period corresponding to a frequency of the oscillator signal.

17. The integrated circuit according to claim 10, wherein the on signal output circuit includes a first timer configured to output the on signal, in response to an elapse of a first time period after the first voltage reaching the second voltage.

18. The integrated circuit according to claim 10, wherein the on signal output circuit includes
   a measurement circuit configured to measure a cycle in which the first voltage reaches the second voltage, and
   a second timer configured to output the on signal upon an elapse of a second time period after the first voltage reaching the second voltage, the second time period corresponding to the measured cycle.

19. A power supply circuit configured to generate for a load an output voltage of a predetermined level from an input voltage thereof, the power supply circuit comprising:
   a transformer including a primary coil, a secondary coil, and an auxiliary coil;
   a transistor configured to control a current flowing through the primary coil; and
   an integrated circuit configured to drive the transistor, the integrated circuit including a first determination circuit configured to determine whether the load is in a first state or in a second state, wherein the load is a heavy load in the first state and a light load in the second state,
   a second determination circuit configured to determine whether a current of the secondary coil is in a continuous mode in which the current of the secondary coil does not reach zero when the transistor is off, or in a discontinuous mode in which the current of the secondary coil reaches zero when the transistor is off, an oscillator circuit configured to output an oscillator signal, and
   a switching control circuit configured to control switching of the transistor in response to a determination result of the second determination circuit and the oscillator signal, when the load is in the second state, and in response to the oscillator signal irrespective of the determination result of the second determination circuit, when the load is in the first state.

20. A power supply circuit configured to generate for a load an output voltage of a predetermined level from an input voltage thereof, the power supply circuit comprising:
   a transformer including a primary coil, a secondary coil, and an auxiliary coil;
   a transistor configured to control a current flowing through the primary coil; and
   an integrated circuit configured to drive the transistor, the integrated circuit including
      a first comparator circuit configured to compare a first voltage corresponding to a voltage on a high potential side of the transistor, with a second voltage,
      an oscillator circuit configured to output an oscillator signal, and
      a switching control circuit configured to control switching of the transistor, the switching control circuit including
         an on signal output circuit configured to output an on signal to turn on the transistor after the oscillator signal is received and a count of the first voltage reaching the second voltage reaches a reference count, in a case where
      a current of the secondary coil is in a discontinuous mode in which the current of the secondary coil reaches zero when the transistor is off,
         an off signal output circuit configured to output an off signal to turn off the transistor, based on a current flowing through the transistor,
         a first holding circuit configured to hold the reference count, and
         an adjustment circuit configured
            to increase the reference count under a first condition, when a load current flowing through the load decreases, and
            to reduce the reference count under a second condition, when the load current increases.

* * * * *